(12) United States Patent
Davis et al.

(10) Patent No.: US 10,635,471 B2
(45) Date of Patent: Apr. 28, 2020

(54) SYSTEM AND METHOD FOR AN AUTONOMOUS ENTITY

(71) Applicant: Joshua Paul Davis, Plano, TX (US)

(72) Inventors: Joshua P Davis, Plano, TX (US); Ronald Munoz, Hackensack, NJ (US)

(73) Assignee: Joshua Paul Davis, Plano, TX (US)

( * ) Notice: Subject to any disclaimer, the term of this patent is extended or adjusted under 35 U.S.C. 154(b) by 997 days.

(21) Appl. No.: 15/052,681

(22) Filed: Feb. 24, 2016

(65) Prior Publication Data

US 2016/0335533 A1 Nov. 17, 2016

Related U.S. Application Data

(60) Provisional application No. 62/162,554, filed on May 15, 2015.

(51) Int. Cl.
*G06N 3/00* (2006.01)
*G06N 5/04* (2006.01)
(Continued)

(52) U.S. Cl.
CPC ............ *G06F 9/45558* (2013.01); *G06F 9/44* (2013.01); *G06Q 40/08* (2013.01);
(Continued)

(58) Field of Classification Search
CPC ............. H04L 2209/56; H04L 2209/38; H04L 9/3236; H04L 9/0637; H04L 9/3297; G06Q 2230/00; G06Q 20/3829; G06Q 20/065
See application file for complete search history.

(56) References Cited

U.S. PATENT DOCUMENTS 5,988,857 A 11/1999 Ozawa et al.
6,842,899 B2 1/2005 Moody et al.
(Continued)

FOREIGN PATENT DOCUMENTS

WO 0188811 A2 11/2001

OTHER PUBLICATIONS

Michael Abramowicz, "Cryptoinsurance," presented Mar. 27, 2015 at the Wake Forest Law Review 2015 Spring Symposium (Year: 2015).*

(Continued)

*Primary Examiner* — Vincent Gonzales
*Assistant Examiner* — Scott R Gardner
(74) *Attorney, Agent, or Firm* — Slater Matsil, LLP

(57) ABSTRACT

According to an embodiment, a processing network is configured to access a reputation system, provide a first user interface, provide a second user interface, receive a request from a user through the second user interface, retrieve user information from the reputation system, assign a plurality of human intelligence tasks based on the request, receive a plurality of results from the plurality of human intelligence tasks, confirm an identity and a status of the user based on the user information and the plurality of results, execute the request based on confirming the identity and the status of the user, and store evidence of execution of the request as an immutable data entry in a permanent database. The first user interface includes information from the reputation system, and the plurality of human intelligence tasks are assigned to a plurality of participants through the first user interface.

21 Claims, 17 Drawing Sheets

(51) Int. Cl.
  *G06F 9/455* (2018.01)
  *G06F 9/44* (2018.01)
  *G06Q 40/08* (2012.01)

(52) U.S. Cl.
  CPC ...... *G06F 2009/4557* (2013.01); *G06N 3/006* (2013.01); *G06N 5/046* (2013.01)

(56) References Cited

U.S. PATENT DOCUMENTS

| | | | |
|---|---|---|---|
| 7,310,626 B2 | 12/2007 | Scarborough et al. | |
| 8,140,681 B2 | 3/2012 | Adam et al. | |
| 2002/0032591 A1 | 3/2002 | Mahaffy et al. | |
| 2005/0027386 A1 | 2/2005 | Weigand et al. | |
| 2005/0273511 A1 | 12/2005 | Ferreira de Andrade et al. | |
| 2007/0192146 A1 | 8/2007 | Menocal et al. | |
| 2010/0293026 A1* | 11/2010 | Vojnovic et al. | G06Q 10/00 705/7.14 |
| 2013/0326067 A1 | 12/2013 | Smith, II et al. | |
| 2014/0236864 A1 | 8/2014 | Roth et al. | |
| 2015/0332283 A1* | 11/2015 | Witchey | G06Q 30/00 |
| 2016/0140653 A1 | 5/2016 | McKenzie | |
| 2016/0226881 A1* | 8/2016 | Huang et al. | H04L 63/102 |
| 2016/0260095 A1* | 9/2016 | Ford | G06Q 20/40 |

OTHER PUBLICATIONS

Gavin Wood, "Ethereum: A Secure Decentralised Generalised Transaction Ledger," Apr. 10, 2014, gavwood.com/paper.pdf (Year: 2014).*
Vitalik Buterin, "Ethereum: A Next-Generation Generalized Smart Contract and Decentralized Application Platform," Blockchain Papers: Curated Cryptoasset Publications, Dec. 28, 2013, accessed Oct. 26, 2018, https://blockchainpapers.org/items/show/2 (Year: 2013).*
Michael Sirivianos, Kyungbaek Kim, Xiaowei Yang, "FaceTrust: Assessing the Credibility of Online Personas via Social Networks", Proceedings of the 4th USENIX conference on Hot topics in security, p. 2-2, Aug. 11, 2009, Montreal, Canada (Year: 2009).*
Taylor Gerring, "Ethereum, Dapps, and the rise of a new Internet," bitcoinmagazine.com, Feb. 3, 2014 (Year: 2014).*
Buterin, V., "SchellingCoin: A Minimal-Trust Universal Data Feed", Mar. 28, 2014, 8 pages.

* cited by examiner

| Factors for determining if a LinkedIn profile is a reputable source for establishing online identity | | |
|---|---|---|
| Is there a picture for their profile? | YES | Use google image search to validate the picture doesn't belong to someone else. If genuine add 1 point. If google image search indicates image belongs to someone else then subtract 5 points. |
| | NO | Subtract 1 point |
| Are there more than 100 connections? | YES | Add 1 point for every 100 connections, round down |
| | NO | Subtract 1 point |
| Are there more than 30 endorsements for skills? | YES | Add 1 point for every 30 endorsements, round down |
| | NO | Subtract 1 point |
| Are there any received or given recommendations? | YES | Add 1 point for each recommendation received or given up to a maximum 3 points |
| | NO | Do nothing |
| How many groups does the person belong to? | Less than 5 | Subtract 1 point |
| | More than 5 less than 25 | Add 1 point |
| | More than 30 | Add 2 points |
| How many bullets were written in total for all job descriptions / positions on entire LinkedIn profile? | less than 10 | Subtract 1 point |
| | 20 > total bullets > 9 | Do nothing |
| | More than 20 | Add 1 point |
| | More than 35 | Add 1 point |
| Can the LinkedIn profile be used to establish an online identity? | | |
| total points =/< 1 | Profile too incomplete to use to establish online identity | Issue a new policy rejection |
| 4 =/> total points > 1 | Possibly a good source for establishing online identity 55% confidence | Inform people that they need to take further steps to strengthen their social media profile and encourage them to reapply. |
| 6 =/> total points > 4 | Very likely a good source for establishing online identity 70% confidence | Inform people that they need to take further steps to strengthen their social media profile and encourage them to reapply. |
| 8 =/> total points > 6 | Almost certainly a good source for establishing online identity 85% | Social media profile is adequate to be used to establish a persons online identity. |
| total points > 9 | Online identity is certain to be linked to real offline persona 95% confidence | Social media profile is adequate to be used to establish a persons online identity. |

*Figure 12b*

| Factors for determining if a Facebook profile is a reputable source for establishing online identity |||
|---|---|---|
| Oldest comment to a post on the person's wall made by someone else occurred how long ago? | less than 6 months | Subtract 2 points |
| | less than 1 year | Subtract 1 point |
| | less than 2 years | add 2 points |
| | less than 3 years | add 4 points |
| | less than 4 years | add 6 points |
| | greater than 4 years | add 8 points |
| Does the person have a profile picture of themselves available? | Yes, but when put into google image search it seems that the photograph belongs to someone else | Subtract 5 points unless additional more genuine pictures of person exist |
| | No | Subtract 1 point |
| | Yes | Add 1 point |
| Has this person been tagged in pictures or posted additional pictures of (him/her)self? | Yes | Add 1 point for each picture taken of them with other people |
| Do other people comment on this person's posts? | Yes | Add 1 point for each post which is longer than 7 words. |
| | | Add 2 points for each post which is longer than 15 words. |
| Do not provide points for the following items: |||
| Likes from others for posts - likes are very easy to counterfeit | Album pictures of random things or interests that don't directly reflect their relationship with other people | Number of posts on their own wall. Posts can be auto generated or borrowed from others. |
| Number of friends. Friends can also be easy to counterfeit | Others posting on their wall without much or any dialog between them and their friends | |
| Can the Facebook profile be used to establish an online identity? |||
| total points =/< 3 | Profile too incomplete to use to establish online identity | Issue a new policy rejection |
| 6 =/> total points > 3 | Possibly a good source for establishing online identity 55% confidence | Inform people that they need to take further steps to strengthen their social media profile and encourage them to reapply. |
| 9 =/> total points > 6 | Very likely a good source for establishing online identity 70% confidence | Inform people that they need to take further steps to strengthen their social media profile and encourage them to reapply. |
| 12 =/> total points > 9 | Almost certainly a good source for establishing online identity 85% | Social media profile is adequate to be used to establish a person's online identity. |
| total points > 13 | Online identity is certain to be linked to real offline persona 95% confidence | Social media profile is adequate to be used to establish a person's online identity. |

*Figure 12c*

SYSTEM AND METHOD FOR AN AUTONOMOUS ENTITY

The present invention claims the priority of provisional Application Ser. No. 62/162,554 filed on May 15, 2015 and entitled, "System and Method for an Autonomous Entity," which is incorporated herein by reference in its entirety.

TECHNICAL FIELD

The present invention relates generally to autonomous systems, and, in particular embodiments, to a system and method for a decentralized autonomous entity.

BACKGROUND

Artificial intelligence (AI) is a created intelligence exhibited by machines or software. In recent years, numerous advancements have occurred in the development of various AI applications leading to increased exposure and interaction with AIs, even at the consumer level. Within the field of AI development, it is often the case that computing technology, which is used to implement an AI, generally can perform some tasks very well and other tasks poorly. That is to say, conventional computing excels at solving certain types of problems while requiring excessive computing resources to solve other problems. It is often the case that non-artificial intelligence, e.g., human intelligence, is much more suited for solving the problems that cause conventional computing to struggle.

There is a push in AI development to create AIs that are better at performing tasks that extend beyond conventional computing. For example, AI research is actively seeking improvements in AI reasoning, AI knowledge, AI planning, and AI communication. As a more specific example, AI machines are often challenged by decision making tasks, especially when the AI machine is tasked with evaluating inconsistent entities, such as human beings, in order to make a decision. Thus, AI development continues to pursue AI machines capable of interacting with humans in an intelligent way. For example, AI machines capable of interacting with any type of person in order to make intelligent decisions based on the interaction are difficult to produce and often difficult to interact with.

SUMMARY

According to an embodiment, a processing network is configured to access a reputation system, provide a first user interface, provide a second user interface, receive a request from a user through the second user interface, retrieve user information from the reputation system, assign a plurality of human intelligence tasks based on the request, receive a plurality of results from the plurality of human intelligence tasks, confirm an identity and a status of the user based on the user information and the plurality of results, execute the request based on confirming the identity and the status of the user, and store evidence of execution of the request as an immutable data entry in a permanent database. The first user interface includes information from the reputation system, and the plurality of human intelligence tasks are assigned to a plurality of participants through the first user interface.

BRIEF DESCRIPTION OF THE DRAWINGS

For a more complete understanding of the present invention, and the advantages thereof, reference is now made to the following descriptions taken in conjunction with the accompanying drawings, in which:

FIGS. 12a, 12b, and 12c illustrate a flowchart diagram and grading rubrics for an embodiment human intelligence task (HIT) to evaluate a new application assigned by an embodiment modular smart contract operating in a DAE;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
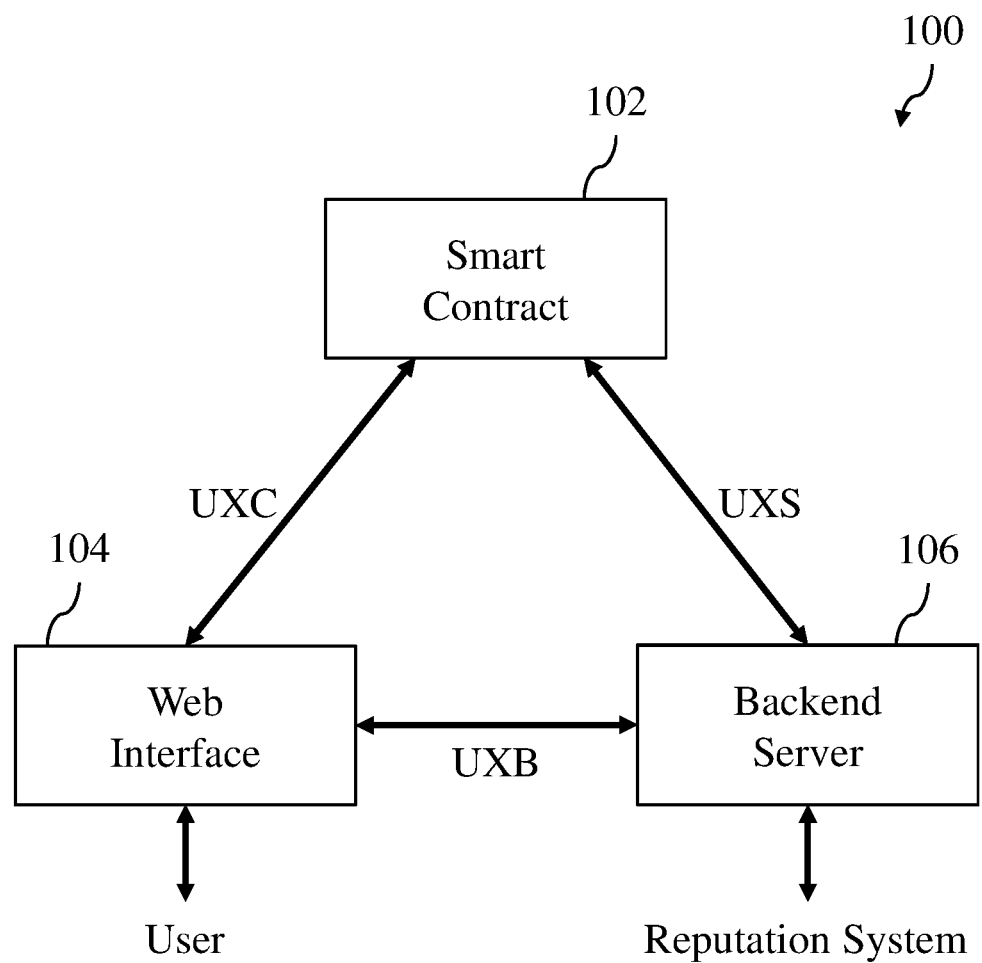
FIG. 1 illustrates a system block diagram of an embodiment decentralized autonomous entity (DAE)

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely artificial intelligence (AI), and more particularly, a decentralized autonomous entity (DAE). Some of the various embodiments described herein include a DAE with access to resources useful for the implementation of the DAE, a DAE using cryptocurrency as a primary resource, a DAE implemented using decentralized blockchain technology such as the Ethereum platform, and a DAE capable of implementing unemployment insurance, a severance package program, or a rotating savings credit association. In other embodiments, aspects may also be applied to other applications involving any type of autonomous system or any type of DAE for any type of application according to any fashion as known in the art. In the various embodiments described herein, a DAE is a more general version of a DAO that is not limited to the implementation of an organization specifically, but rather may be any type of autonomous entity.

A specific type of AI includes a decentralized autonomous organization (DAO). A DAO is a type of AI that operates an organization in an autonomous manner without the intervention of human operators. A specific DAO operates with a number of specific rules or functions to implement a specific type of organization. In particular, a DAO generally includes access to a financial resource, such as a cryptocurrency resource, for use in implementing the rules or functions of the organization. Although a DAO may employ a human for a specific task, the human is not a part of the organization structure in the sense of a traditional employee. A DAO, as an AI, depends on the rules or functions defining its interactions in order to implement the specific organization. Thus, because a DAO is not immune to the common challenges of AI in general, actual implementations of DAOs are limited.

For example, without user identification, passwords, or access to physiological characteristics, AIs in general, and DAOs specifically, often are challenged by the task of determining an identity of an interacting human or the honesty of such a person. In order to implement a DAO with additional functionality and better performance, improvements are needed in AI interactions in order to better establish identity and honesty for decision making.

According to various embodiments, a DAE is implemented that is capable of confirming identity of interacting humans, evaluating honesty of the interacting humans, and determining appropriate responses based on the interaction. In such embodiments, the DAE may implement an insurance function capable of autonomously implementing corporate policy that will pay out claims for unemployment insurance. An insurance DAE is governed by a smart contract operating as an autonomous entity on a decentralized blockchain platform. A blockchain platform uses a public or global ledger to confirm each transaction and operation on the global ledger using consensus. For example, the Ethereum platform uses a global ledger or blockchain that hosts and executes a Turing complete instruction set.

In some embodiments, an insurance DAE is implemented as a smart contract that defines the operating principles which determine how insurance policies are issued, how insurance claims are decided, how the organization manages all assets or resources, and how the organization employs assets or resources to acquire human intelligence in order to improve decisions made by the DAE. In other embodiments, the DAE may implement severance package functions or a rotating savings credit association function.

In some embodiments, an insurance DAE is capable of autonomously performing the following functions related to, for example, unemployment insurance functions: creating a peer to peer platform for the issuing of new policies, accepting premiums, acquiring human intelligence by employing human agents to complete human intelligence tasks (HITs), evaluating eligibility for new policies and new claims, creating a peer to peer platform for the approving of new claims, implementing a Schelling point protocol to decide the fair length of new claim awards, implementing a Schelling point protocol to determine a fair price for the completion of a HIT, reassigning and auctioning HITs which go uncompleted, assigning fair fees to policy holders who do not participate in HITs, determining claim extensions, and paying claim awards.

Historical AI poses a number of challenges in relation to identifying humans, interacting with humans, evaluating the honesty of humans, and making decisions based on the interaction. In order to implement numerous types of DAEs that may operate in relation to humans, embodiments described herein provide a system and method for a DAE that addresses the challenges of determining identity and confirming honesty when interacting with a human. When using an autonomous system, such as a DAE, it is generally a risk that humans interacting with the DAE are able to trick the system by lying to the system about critical information. It may be the case that a general AI has difficulty detecting such a lie. Various embodiments described herein increase the difficulty or negative impact of lying to the DAE. Particularly in the realm of unemployment insurance, severance packages, or rotating savings credit associations, embodiments described herein provide a DAE that implements such systems while verifying identity and evaluating honesty.

Description of embodiment DAEs are primarily presented in the specific context of unemployment insurance as an example. However, the specific functionalities and advantages of the embodiment DAEs, or more generally AIs, described herein are not limited to only the application of an unemployment insurance business. The embodiment autonomous entities described herein may have numerous applications in all types of devices, machinery, manufactures, smart homes, smart environments, automobiles, computers, robots, and organizations, for example, where interaction with humans or other machines is of relevance. Thus, the scope of the various embodiments should be interpreted in view of the claims.

Before describing specific embodiments in reference to the figures, some of the various technologies and ideas included in the implementation of various embodiments are described in an overview form herein below. A DAE may be built on blockchain technology. For example, Ethereum is a blockchain technology platform that enables the execution of computer instructions or smart contracts using the cryptocurrency ether as a cryptocurrency resource. In order to confirm identity and honesty, embodiment DAEs use an established reputation system to grade an interacting human and, with the assistance of a plurality of assigned HITs, determine the likelihood that a given reputation system entry belongs to a unique human individual, thus establishing a unique identity. For example, LinkedIn and Facebook are social media reputation systems that may be used by an embodiment DAE. In such embodiments, the use of reputation systems with various grading techniques and a plurality of HITs provide prevention mechanisms for Sybil attacks when establishing a unique identity.

In various embodiments, a DAE determines and executes resource allocations to participants in the DAE in order to incentivize early participation in the DAE application, participation in HITs, growth of DAE by conveying a sense of ownership to each participant, promotion of the DAE, and payment of higher premium amounts in order to more rapidly grow the resource pool for the DAE. In various embodiments, a DAE may self-adjust resource payouts, such as for claim awards, in order to maintain the health of the resource pool when demands increase and resources available to the DAE decrease.

In various embodiments, a DAE assigns a plurality of HITs to participants related to new applications for participation in the DAE system and related to resource requests. In such embodiments, resource requests by participants may require the requester to use some amount of social capital in order to receive resources. For embodiments implementing unemployment insurance, for example, such methods simultaneously deter fraud and shorten time spent unemployed because it imposes a liar cost for fraudulent claims while facilitating genuine claimants to more easily leverage their social networks to each find his or her next job. The spending of social capital allows the DAE to verify a recipient's employment status by requiring that his or her social network pledge its support for the recipient and affirm its willingness to assist the recipient to find a new job. This also motivates each recipient to increase his or her social network if he or she wishes to continue collecting on a claim. Further, by requiring claimants to spend social capital in order to validate claims, the DAE also implements a type of viral marketing mechanism that encourages additional participants.

In various embodiments, a DAE includes a consensus mechanism which allows policy holders to change or modify the DAE, such as an insurance corporate policy implemented by a DAE, through an automated mechanism including a number of steps. In some embodiments, the steps include: receiving proposed change requests, opening a forum for discussion to decide if a matter should be brought to a vote, opening a voting window in order to collect, tally, and publish the results from voting, opening a change window if a vote to change passes, executing the change and determining if the change was successful, and finalizing the change if the change was successful and closing the change window. In such embodiments, a DAE may be formed with a modular hub and spoke smart contract architecture to allow for execution of changes through the updating of pointers in the hub which resolve to specific spoke module locations corresponding to the changes and eliminating pointers to other specific spoke module locations corresponding to previous versions. This architecture allows for current smart contract code to exist in parallel to proposed new smart contract code changes. Such embodiment architectures may improve the identification of differences between the existing code of the smart contract and the new code of the smart contract. Further, such architecture may enable quick transitions to new code for the smart contract and quick reversions to previous code for the smart contract if necessary.

In some embodiments, a DAE implemented using blockchain technology facilitates transparency in the allocation of resources, such as for awarding of claims. In addition to the publishing of claim award results, the specific smart contract logic which determines the result of a claim and the exact computational steps taken to reach that result are also published through the use of blockchain technology. In such embodiments, the entire resource allocation history of the DAE, including all premiums received, all claims and dividends paid, and any overhead costs, are also published through the public ledger. Such transparency allows anyone to review the operation of the DAE at any time, such as to perform a financial audit.

In some embodiments, due to the nature of autonomous smart contracts, the actions of the DAE are determined solely by the specific instructions of the smart contract and cannot be influenced or modified by any third party. Such implementations using blockchain technology include a division of operational control of the DAE that allows for the roles and functions of participants to be limited by the smart contract. In a specific example, developers can program the smart contract code, but are unable to later modify or change that code. Similarly, participants, i.e., policy holders, can assist the DAE to decide the allocation of resources, such as the fair awarding of insurance claims, without being given the ability to execute unfair bias toward any particular participant or request. Further, resource allocations, such as claim payments, cannot be blocked or delayed by policy holders, developers, or any other third party. Finally, changes to the smart contract itself cannot be performed arbitrarily because the changes require a majority of policy holders to agree.

Given these features, insurance outcomes can be predictably simulated on the basis of a published smart contract with greater reliability than simulating how existing insurance institutions behave. This allows participants to determine with a higher degree of confidence the likelihood a claim will be paid out relative to existing insurance institutions which are subject to human error, coercion, bias, and corruption.

Thus, due to these described features and the associated transparency, various embodiment DAEs have a basis for acquiring human trust, currency resources, and human intelligence resources. In such embodiments, a DAE may obtain autonomy provided by blockchain technology that distances smart contracts from their creators and may obtain trust by providing reliably predictable outcomes, greater transparency in claims determination, and greater ability to audit the financial operations of the DAE. The DAE may operate an insurance smart contract capable of acquiring monetary resources and human intelligence resources needed to pay out claims to unemployed individuals who purchase insurance. In further embodiments, the DAE may operate a rotating savings account or a severance program using similar techniques with similar capabilities.

According to some embodiments, a DAE may be implemented using the smart contract platform Ethereum. In such embodiments, the DAE may include a hub and spoke consensus mechanisms for changing the smart contract code, a Sybil attack prevention mechanism based on a reputation system, a dividend payout structure to motivate early adoption and incentivize HIT participation, an auction system using a Schelling point protocol to determine the fair cost of completing a HIT reassigned from non-participating policy holders, a self-adjusting claim award mechanism utilizing Schelling points and HITs in coordination with the DAE that collects results and automates the claim process, and a method for validating unemployment requiring claimants to spend social capital.

A specific embodiment unemployment insurance DAE implements a technology that automates the issuing of new policies, the collection of premiums, and the awarding of new claims. In such an embodiment, the DAE is a truly autonomous entity implemented as a software program to manage all aspects of running an insurance corporation. The DAE is capable of implementing a corporation requiring no fulltime employees where the DAE is able to hire and utilize human intelligence as needed. Such a DAE may enable the reversal of the current corporate infrastructure in which human beings employ software as needed.

According to further embodiments, a DAE may also function as a system to determine fair awards for corporate severance packages. In such embodiments, corporate severance packages function in a similar manner as unemployment insurance in principle. Thus, slight modifications to the DAE can enable the DAE to implement severance packages. In such embodiments, a DAE operating according to blockchain technology is able to fairly award corporate severance packages which are tailor suited to the needs of each individual recipient without the corporation ever needing to overpay severance awards as they exist in the current system. The DAE would be immune to bias inherent in the system by which supervisors are granted the discretion to express their favoritism toward some employees but not others. Further, the DAE would enable the corporation to outsource what has traditionally been an expensive program to a relatively cheap peer-to-peer platform with significantly reduced costs.

According to various embodiments, a DAE may require resources to operate. In some embodiments, the DAE uses human intelligence resources and monetary resources to operate. The DAE is able to obtain such resources by maintaining autonomy and encouraging trust in the DAE. For example, in an insurance implementation, the DAE is able to encourage trust by paying out unemployment insurance claims mandated by the smart contract. The auditable public ledger of the blockchain helps to establish a reputation that allows the DAE to gain the trust of later participants.

In such embodiments, the ability to pay out insurance claims may be based on acquiring monetary resources and human intelligence resources. The DAE uses the participation of policy holders who pay monthly premiums and participate in HITs in order to provide the resources for operating and paying out insurance claims. In order to obtain participants, the DAE creates public trust through establishing a track record with an initial set of participants. For example, initial participants able to understand the Ethereum platform and review smart contracts reach the conclusion that the smart contract based on which the DAE is operating can be trusted to execute and pay out claims fairly. Later participants can judge the DAE's reputation of consistently paying out claims fairly.

In such embodiments, the ability to generate public trust is based on the DAE's ability to provide reliable outcomes. Examples of reliable outcomes for an unemployment insurance DAE include fairly approved applications for new policies that prevent potential fraud, trustworthy accounting for receipt of premiums, fairly charged fees for all policy holders, fairly decided and paid insurance claims with fraud prevention mechanisms, and fairly paid dividends. In some embodiments, the DAE is able to provide such reliable outcomes through the autonomous execution of an insurance smart contract. In such embodiments, the DAE operating based on the smart contract is autonomously able to open new policies, collect premiums, employ human agents, assign and reassign HITs, charge fees, decide claims and extensions, manage and pay claims, award and pay dividends, and update the smart contract using community consensus provided by the participants of the DAE.

In various embodiments, the DAE is able to maintain autonomy through the structure of a smart contract operating using blockchain technology that is able to provide computationally reliable outcomes. Through the operation of the DAE based in the smart contract, collusion is prevented by clearly dividing the smart contract developers, the DAE participants, and the blockchain platform. Thus, in some embodiments, blockchain technology provides a basis for autonomy, a secure publishing platform, a secure computation platform, and a secure payment platform. According to various embodiments, the DAE uses the secure publishing platform provided by blockchain technology to notarize or store records, resource allocations, or specific operations on the blockchain as a database. In such embodiments, various such operations or other information may be stored on the blockchain as an immutable entry in a permanent database. Thus, the blockchain may be used to implement a permanent database for storing various operations. In such embodiments, as long as the blockchain publishing platform, such as Ethereum for example, continues to operate, the various operations and information stored on the blockchain as a database are immutable. According to various embodiments, the DAE operation using a blockchain publishing platform, such as Ethereum, thus contributes to the autonomy of the DAE and the establishment of trust through transparency and reliability.

The overview described hereinabove presents various elements and applications relevant to embodiment DAEs. Further description of specific embodiment DAEs is presented herein below in reference to the figures.

FIG. 1 illustrates a system block diagram of an embodiment DAE 100 including a portion implemented by smart contract 102, a portion implemented with web interface 104, and a portion implemented on backend server 106. According to various embodiments, smart contract 102 includes many of the major functions of DAE 100 and primarily specifies how DAE 100 operates. Web interface 104 functions to communicate with a participant or user. Smart contract 102 and web interface 104 communicate and share information through contract interface channel UXC. Backend server 106 provides access to a reputation system and provides backend storage of various elements, such as graphical user interfaces (GUIs) and content data for web interface 104. Backend server 106 communicates with web interface 104 through backend interface channel UXB, and backend server 106 communicates with smart contract 102 through server interface channel UXS.

In various embodiments, smart contract 102 operates on a decentralized blockchain that executes resource transactions and smart contract instructions. In a specific embodiment, smart contract 102 operates on the Ethereum blockchain which executes cryptocurrency transactions, known as ether powered transactions, as resource transactions and implements the software instructions of smart contracts submitted to the Ethereum blockchain. In other embodiments, smart contract 102 may operate on another type of decentralized computing system. Web interface 104 operates in a user's web browser and backend server 106 is a server system that includes data storage and instructions as described further herein below in reference to the other figures. For example, the functions of web interface 104 are implemented using HTML and the functions of backend server 106 are implemented using JavaScript.

According to various embodiments, DAE 100 operates through smart contract 102, web interface 104, and backend server 106 with different hardware configurations. For example, smart contract 102 may operate as a smart contract operating on blockchain technology. In such embodiments, smart contract 102 may be implemented on multiple computing nodes in a computer network. For example, each computing node may be a computer including a memory and a processor configured to execute instructions stored in the memory. The computing nodes may collaborate in a decentralized manner to operate a consensus network using blockchain technology. In such embodiments, the multiple computing nodes may supply compute power to the computer network operating the blockchain that includes smart contract 102. The multiple computing nodes may be connected through a public network, such as through the internet, in some embodiments. In other embodiments, the multiple computing nodes may be connected through a private network, such as an internal company network, e.g., an intranet. In specific embodiments, the multiple computing nodes are connected through a local area network (LAN). In particular embodiments, smart contract 102 is implemented on 100 or more computing nodes.

Further, backend server 106 may include a processing units and memory storage units. In some embodiments, backend server 106 may be a personal computer including a memory and a processor configured to execute instructions stored in the memory. In other embodiments, backend server 106 may include additional storage and computing resources. For example, backend server may include magnetic hard drive based storage, solid state device based storage, tape based storage, or optical media based storage. In such various embodiments, the storage may store instructions for the operation of DAE 100 and the various interactions with web interface 104 and smart contract 102 described herein. Additionally, in some embodiments, backend server may include multiple computing elements including, for example, multiple central processing units (CPUs) or multiple graphical processing units (GPUs). In specific embodiments, backend server 106 may include ten or more CPU cores. In such embodiments, backend server 106 may also include five or more GPUs. In alternative embodiments, backend server 106 may be implemented on a same computer network as smart contract 102. For example, the multiple computing nodes, each with one or more processing units and one or more storage units, may implement the functionality of both backend server 106 and smart contract 102.

Further, web interface 104 may be implemented as a user terminal or user interface. In such embodiments, web interface 104 may be implemented on a personal computer or a computing unit including a memory and a processor configured to execute instructions stored in the memory. Thus, web interface 104 may include a user terminal that executes the computer instructions to implement the various functions described herein in reference to web interface 104. In some embodiments, the computer or user terminal that implements web interface 104 may also be part of the computer network that operates smart contract 102 or that operates as backend server 106. Various modifications and additional hardware configurations for implementing embodiment computer networks for operating DAE 100 will be readily appreciated by those having skill in the art. Such modifications are envisioned within the scope of the present disclosure.

Figure 2:
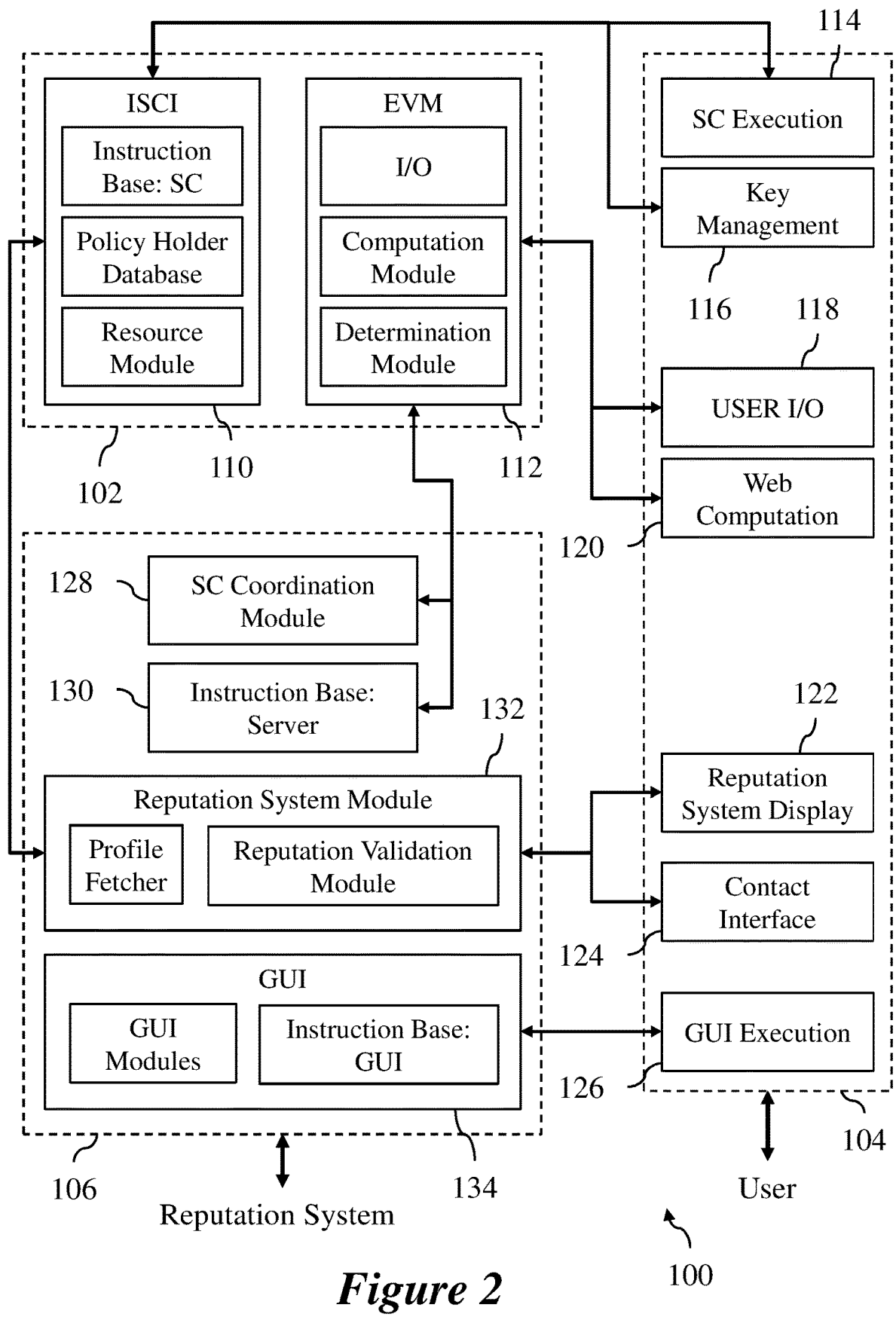
FIG. 2 illustrates a functional block diagram of the embodiment DAE.

FIG. 2 illustrates a functional block diagram of DAE 100 according to an embodiment for providing unemployment insurance that includes additional details. According to various embodiments, smart contract 102, web interface 104, and backend server 106 are coupled together to communicate information and implement the various functions of DAE 100. In such embodiments, smart contract 102 includes insurance smart contract instructions (ISCI) 110 and Ethereum virtual machine (EVM) 112. ISCI 110 includes the smart contract (SC) instruction base, a database of the policy holders, and a resource module. EVM 112 includes an input/output (I/O) module, a computation module, and a determination module. In various embodiments, the instruction base for the smart contract in ISCI 110 includes all the instructions or software code of smart contract 102 available for execution on the blockchain. EVM 112 is a virtual machine running the instructions of the ISCI 110 on the Ethereum blockchain and performs some of the main operations of DAE 100 in order to receive applications, admit new policy holders, receive resource payments, receive new claims, determine payment of new claims, and interface with web interface 104 and backend server 106. In another embodiment, smart contract 102 may be implemented on another type of decentralized computing system.

In some embodiments, web interface 104 includes SC execution module 114, key management module 116, user I/O module 118, web computation module 120, reputation system display 122, contact interface 124, and graphical user interface (GUI) execution module 126. SC execution module 114 receives instructions or software code from smart contract 102 for execution in the environment of web interface 104, such as in a user's browser. Key management module 116 stores and receives a user's resource allocation address and access key, such as cryptocurrency public and private keys. In such embodiments, because smart contract 102 may be publically available on the blockchain, which is often the case for decentralized blockchain technologies, the storage and management of private keys may be maintained in web interface 104 on the side of the user.

In various embodiments, user I/O module 118 functions to provide information and receive responses from a user, either a new policy applicant or a participant in DAE 100, and to communicate the received responses to EVM 112. Web computation module 120 operates based on smart contract instructions received in SC execution module 114 in order to aggregate information received from a user through user I/O 118 and determine if initial entries by the user meet a minimum standard.

In various embodiments, reputation system display 122 receives information from backend server 106 that includes details obtained from a user's reputation system and displays the information to another user, such as a participant in the DAE 100. Contact interface 124 also communicates with backend server 106 in order to display and manage communication with a user's contacts from the user's reputation system. GUI execution module 126 includes all of the GUI instructions for providing a specific GUI for each different function provided by web interface 104. In such embodiments, GUI execution module 126 receives the executable instructions for each GUI from backend server 106.

In some embodiments, backend server 106 includes SC coordination module 128, server instruction base 130, reputation system module 132, and GUI module 134. SC coordination module 128 functions to coordinate with smart contract 102 for more complex tasks, such as modifying the smart contract itself and reassigning human intelligence tasks (HITs). In alternative embodiments, all such complex tasks may be performed by smart contract 102 alone and SC coordination module 128 may be omitted.

Server instruction base 130 includes all the instructions or software code of backend server 106 available for execution in backend server 106 or in web interface 104. In such embodiments, server instruction base 130 includes the instructions for SC coordination module 128, reputation system module 132, and GUI module 134.

In various embodiments, reputation system module 132 includes a profile fetcher and a reputation validation module. The profile fetcher interfaces with a reputation system, such as LinkedIn or Facebook, for example, and extracts and parses a reputation profile for relevant information. The reputation validation module then provides the reputation information to both smart contract 102 and web interface 104 for evaluation by smart contract 102 and feedback from a participant. The reputation validation module also may submit validation requests to contacts from a user's reputation system profile in order to confirm a user's status. The information received from participants in the DAE 100 through web interface 104 and received from contacts from the user's reputation system profile is provided to smart contract 102 for decision making.

In various embodiments, GUI module 134 provides the executable instructions to GUI execution module 126 in web interface 104. GUI module 134 includes each GUI module for each function and corresponding interface in web interface 104 and also includes the GUI instruction base. In various embodiments, further details of backend server 106 and web interface will become apparent as the primary functioning for DAE 100 is described herein in reference to the other figures.

In reference to the description of FIG. 2, the instructions or software code of smart contract 102 and backend server 106 are identified separately from the modules that execute the instructions or software code. In such embodiments, the modules and instructions are not necessarily separate elements, as the modules function according to the instructions, but instead are shown separately to recognize both the instructions specifically as well as the functions performed.

Figure 3:
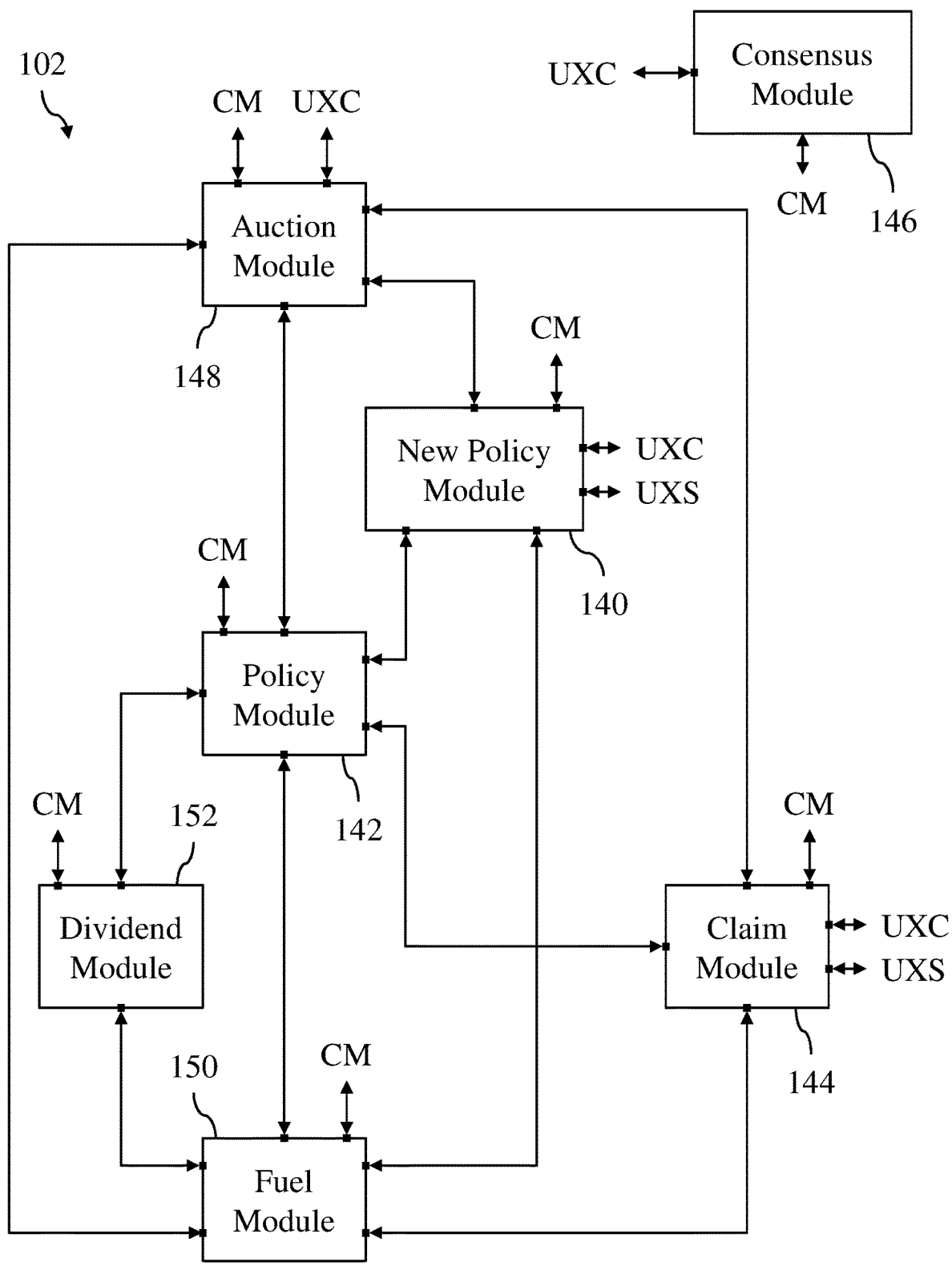
FIG. 3 illustrates a system block diagram of an embodiment modular smart contract.

FIG. 3 illustrates a system block diagram of an embodiment modular smart contract 102 that includes policy module 142, claim module 144, new policy module 140, auction module 148, fuel module 150, dividend module 152, and consensus module 146. According to various embodiments, smart contract 102 performs many of the primary functions for DAE 100 and uses backend server 106 and web interface 104 in order to interface with participants and applicants. Policy module 142 includes a list of all the participants in DAE 100. The list may include each participant's public resource location, public information about the participant, and the participant's history. In some embodiments, the resource location is a cryptocurrency public key.

In various embodiments, in order to be added to the list of participants included in policy module 142, an applicant submits an application to DAE 100. The application is submitted through web interface 104 and received at new policy module 140. New policy module communicates with web interface 104 through contract interface channel UXC and communicates with backend server 106 through server interface channel UXS. After receiving an application, new policy module 140 gathers information needed to validate job history, collects an anti-fraud pledge, verifies access to a reputation system, and verifies a current employment status by contacting a plurality of references from the applicant's reputation system profile. In specific embodiments, the reputation system is LinkedIn or Facebook, and the applicant is required to present, for example, five references from the applicant's profile who can verify the applicant's employment status. Thus, new policy module 140 performs steps to establish an online identity of the applicant.

New policy module 140 also submits a request to human participants to perform a task, such as a human intelligence task (HIT), of verifying the applicant's identity and evaluating the new policy application. For example, a new policy HIT may include the process of emailing an existing policy holder (participant) requesting a new policy evaluation task, accessing an integrated reputation system interface with DAE 100 that fetches and displays an applicant's profile, and the existing policy holder rating the likelihood that the applicant's reputation system profile represents a real person tied to a real identity. New policy module 140 then grants a new policy based on responses from the HITs if the application qualifies. New policy module 140 also performs the final setup by sending a letter stating that the policy is valid or invalid, adding the applicant to the list of participants in policy module 142, and creating an auto-pay option for submitting resources to DAE 100. In some embodiments, the policies are unemployment insurance policies and the primary resource is a cryptocurrency. Further details and alternatives for new policy module 140 are presented herein below in reference to the other figures.

In various embodiments, when a participant requires resources, the participant submits a claim for resources to claim module 144. For example, when a participant is unemployed and smart contract 102 implements unemployment insurance, the unemployed participant may submit an unemployment claim for collecting a payment from the unemployment policy pool. Thus, claim module 144 opens a new claim and begins to evaluate the request. Specifically, claim module 144 checks that the claimant, or participant claiming unemployment, is eligible to open a new claim, receives the claim application and presents disclaimers, and verifies the health of the policy pool to decide how to approach the claim process. In some embodiments, the claimant may submit a resource fee in order to provide DAE 100 resources for the operation of evaluating the claimant's request. Claim module 144 communicates with web interface 104 through contract interface channel UXC and communicates with backend server 106 through server interface channel UXS.

Claim module 144 also submits a request to human participants to perform HITs of evaluating and awarding the claim. For example, a claim HIT may include the process of emailing existing policy holders (participants) requesting a claim evaluation task, accessing an integrated reputation system interface with DAE 100 that fetches and displays a claimant's profile, the claim statement, and the health of the policy pool, and the existing policy holders recommending the duration or amount of claim payments. In such embodiments, the claim payments may be executed as cryptocurrency transfers to the claimant. There may be different claim determination processes for the human evaluator performing the HIT based on the health of the policy pool. For example, if the policy pool is healthy, claim module 144 may recommend the maximum claim award and, if the policy is not healthy, claim module 144 may perform a Schelling point algorithm estimation process using multiple existing policy holders performing HITs to determine a fair claim award relative to the resources or funds available to the policy pool.

Based on responses from the claim HITs, claim module 144 determines the award amount and awards the claimant and the existing policy holders who performed HITs. In some embodiments, claim module 144 also performs periodic claim checks as the claim award is paid out. Specifically, claim module 144 validates that the claimant is still unemployed through the reputation systems, contacts references provided by the claimant through the reputation system to confirm employment status, displays information and forms to the references provided by the claimant in order to receive confirmation, notifies the claimant of the status of references' responses, removes the claimant from an award group once the claimant has obtained employment, and communicates the process for claim extension to claimant. If a claim extension is needed, claim module 144 may initiate new HITs to determine a claim extension. Further details and alternatives for claim module 144 are presented herein below in reference to the other figures.

In various embodiments, when an existing policy holder does not complete an assigned HIT, auction module 148 reassigns each uncompleted HIT through an auction process. Auction module 148 communicates through contract interface channel UXC with web interface 104. In such embodiments, auction module 148 presents uncompleted HITs to participants in DAE 100 for bidding on the uncompleted HITs. Auction module 148 fairly distributes the uncompleted HITs at a fair market price using a Schelling point approach to an open auction. Based on the auction, auction module 148 assigns the auction HITs with instructions to the auction winners and awards the auction winners each HIT award when each HIT is completed. If an auction winner does not perform a HIT won in an auction, the auction winner may receive a penalty. Auction module 148 initiates the penalty and submits an explanation to the auction winner. For the participant who originally did not complete the assigned HIT, the award given to the auction winner who completed the task for the original participant is billed to the original participant as a non-participation fee. Auction module 148 initiates the fee and submits an explanation to the original participant. Further details and alternatives for auction module 148 are presented herein below in reference to the other figures.

In various embodiments, smart contract 102 may be altered by the participants in DAE 100. Consensus module 146 provides a mechanism for the participants to issue such alterations through consensus. Consensus module 146 communicates with web interface 104 through contract interface channel UXC. In some embodiments, consensus module 146 may email notification of a developer request to perform changes to smart contract 102 along with instructions for participation in discussion and voting, identify lines of code to be altered and a potential impact of those alterations, operate a forum discussing positive and negative possible outcomes for the proposed alteration, conduct a vote for the proposed alteration, and executing the proposed alteration to smart contract 102 when the vote passes. Further details and alternatives for consensus module 146 are presented herein below in reference to the other figures.

In various embodiments, the participants in DAE 100 effectively become shareholders in DAE 100. Thus, dividend module 152 pays out dividends to the participants as DAE 100 acquires more resources than necessary. Specifically, in embodiments where DAE 100 implements unemployment insurance, as each participant contributes premiums as cryptocurrency transactions, the policy pool grows. Based on a timeline or on the policy pool health, dividend module 152 determines dividend payouts for each participant based on contribution and duration of participation in DAE 100. Dividend module 152 calculates a specific participants share using a shareholder formula, for example, and pays out the dividends yearly. Further details and alternatives for dividend module 152 are presented herein below in reference to the other figures.

As described briefly hereinabove in reference to other modules of smart contract 102, DAE 100 operates based on a primary resource, which may be referred to as fuel. Fuel module 150 in smart contract 102 receives all of the primary resource inputs, such as from the participants in DAE 100, and executes all of the resource allocations. In various embodiments, the primary resource is a cryptocurrency, the resource inputs are cryptocurrency payments into DAE 100, and resource allocations are cryptocurrency transfers from DAE 100 to participants. In a more specific embodiment, the primary resource is ether on the Ethereum cryptocurrency platform and smart contract 102 operates on the Ethereum blockchain. In such embodiments, fuel module 150 includes all of the ether of DAE 100 as a resource pool. Participants in DAE 100 pay ether into the resource pool, which may be referred to as the policy pool, in order to enable DAE 100 to operate. Fuel module 150 executes ether transactions to participants in DAE 100 based on instructions received from the various other modules in smart contract 102 as described further herein.

Figure 4:
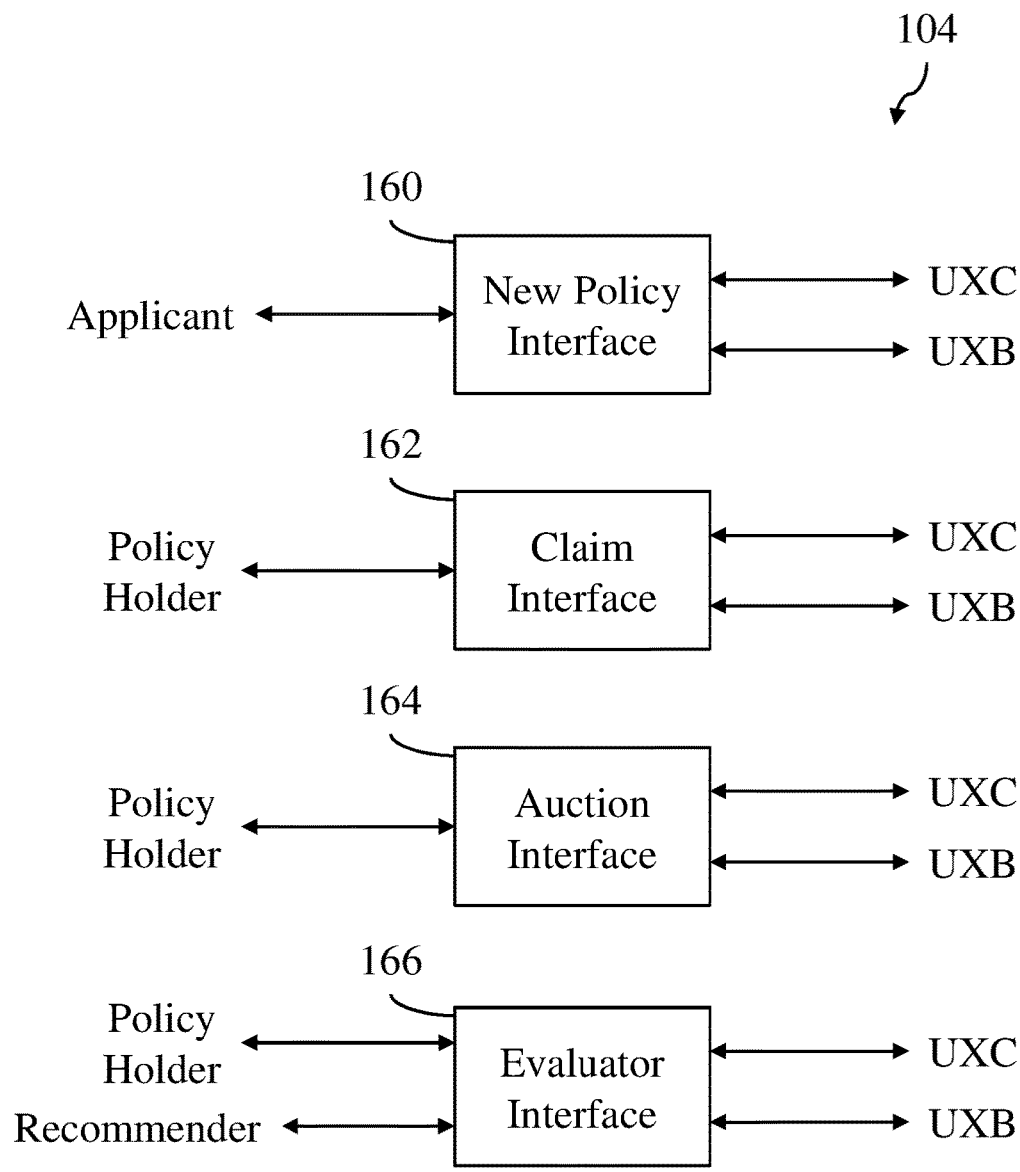
FIG. 4 illustrates a system block diagram of an embodiment web interface.

FIG. 4 illustrates a system block diagram of an embodiment web interface 104 including new policy interface 160, claim interface 162, auction interface 164, and evaluator interface 166. According to various embodiments, new policy interface 160 provides an interface for an applicant to DAE 100 to submit an application, claim interface 162 provides an interface of a participant in DAE 100 to submit a claim, auction interface 164 provides an interface for participants in DAE 100 to bid on uncompleted HITs, and evaluator interface 166 provides an interface for participants in DAE 100 or recommenders from a policy holder's reputation system to perform various evaluations for DAE 100 in reference to claims and new applications. Each interface may include a custom GUI that provides relevant information for the specific functions. Web interface 104 may be implemented as HTML, for example, and includes software instructions executed in a user's, such as an applicant's or a participant's, web browser.

In various embodiments, new policy interface 160 communicates with an applicant, performs an initial evaluation of a new application, and transmits the received information to smart contract 102 through contract interface channel UXC and to backend server 106 through backend interface channel UXB. Claim interface 162 communicates with a policy holder, performs an initial evaluation of a new claim, and transmits the received information to smart contract 102 through contract interface channel UXC and to backend server 106 through backend interface channel UXB. Auction interface 164 communicates with a policy holder, receives bids from the policy holder, transmits the received information to smart contract 102 through contract interface channel UXC and to backend server 106 through backend interface channel UXB, and communicates of failing and winning bids with the policy holder. Evaluator interface 166 communicates with a policy holder or a recommender of a claimant and allows the evaluator and recommender to submit information regarding the new applicant or claimant to smart contract 102 through contract interface channel UXC and to backend server 106 through backend interface channel UXB.

Figure 5:
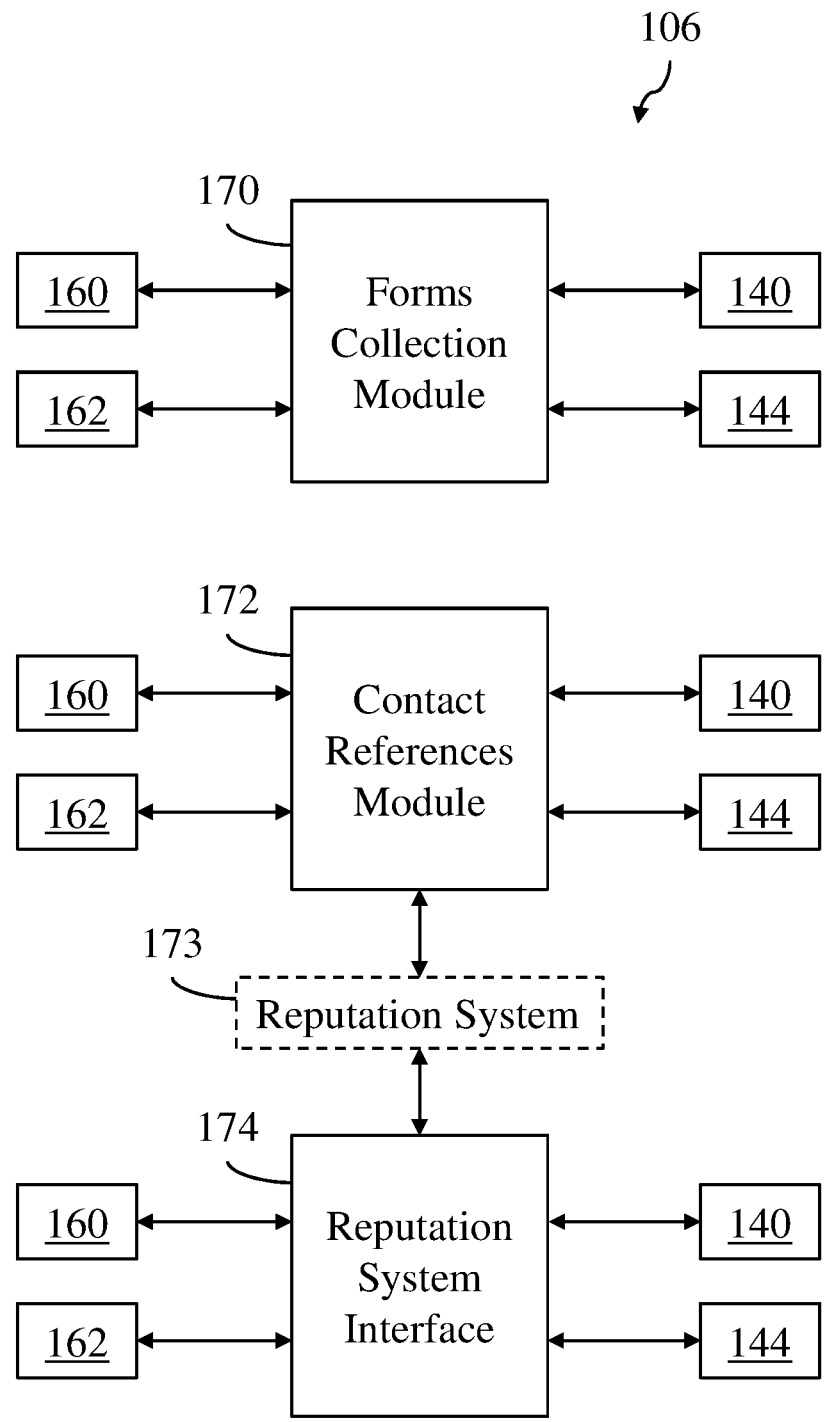
FIG. 5 illustrates a system block diagram of an embodiment backend server.

FIG. 5 illustrates a system block diagram of an embodiment backend server 106 including forms collection module 170, contact references module 172, and reputation system interface 174. According to various embodiments, forms collection module 170 includes forms including disclaimers, responsibilities, and signatures that are presented to an applicant or to a claimant and collected from the applicant or claimant after having been signed. On the user side, forms collection module 170 communicates with new policy interface 160 and claim interface 162 in web interface 104. Forms collection module 170 communicates with new policy module 140 and claim module 144 in smart contract 102.

In various embodiments, contact references module 172 operates to communicate with references provided by an applicant or a participant and to gather responses from the references. The references are provided through reputation system 173, such as LinkedIn or Facebook. Contact reference module 172 may communicate with the references in order to confirm employment status during an application or confirm unemployment during a new claim process. On the user side, contact reference module 172 communicates with new policy interface 160 and claim interface 162 in web interface 104. On the smart contract side, contact reference module 172 communicates with new policy module 140 and claim module 144 in smart contract 102.

In various embodiments, reputation system interface 174 operates to communicate with participants who are evaluating references for new applications provided by an applicant or a participant and to gather responses from the references. Reputation system interface 174 gathers information about an applicant or claimant/requester from reputation system 173 as described hereinabove in reference to reputation system module 132 in FIG. 2 and provides the information to the evaluator through new policy interface 160 and claim interface 162 in web interface 104. On the smart contract side, reputation system interface 174 communicates with new policy module 140 and claim module 144 in smart contract 102 based on responses provided by a participant who is reviewing a new application or a request/claim for resources.

Figure 6:
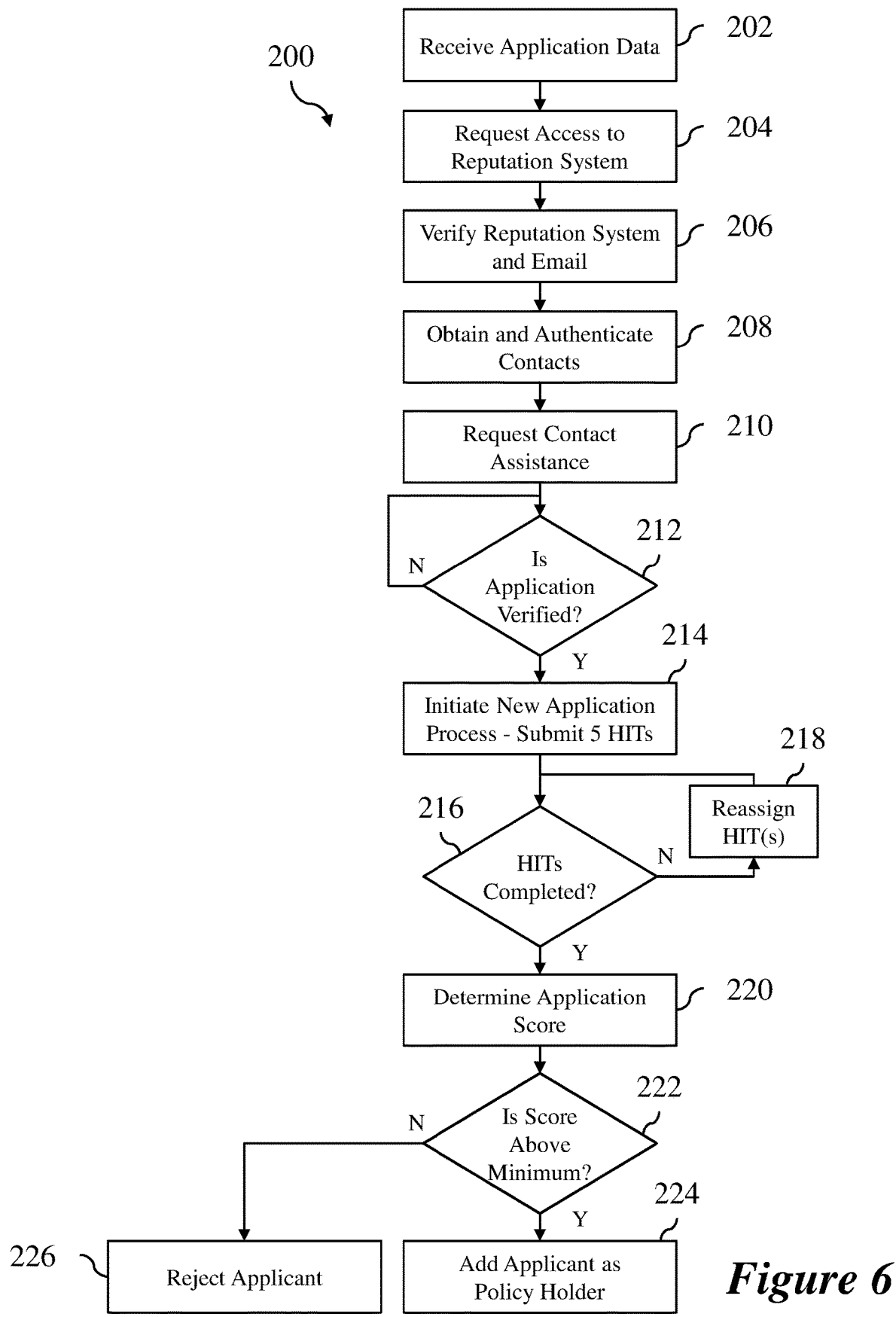
FIG. 6 illustrates a flowchart diagram of an embodiment method of operating an application module for an embodiment modular smart contract operating in a DAE.

FIG. 6 illustrates a flowchart diagram of an embodiment method of operation 200 for an application module for an embodiment modular smart contract operating in a DAE. According to various embodiments, method of operation 200 includes the operation of an application module for a DAE, such as new policy module 140 described hereinabove in reference to FIG. 3, which determines whether to admit a new applicant into participation in the DAE. Method of operation 200 includes steps 202-226. In such embodiments, step 202 includes receiving application data. As described hereinabove in reference to the other figures, the DAE may perform any number of operations. Here the application module and method of operation 200 are described in reference to a DAE configured to operate an unemployment insurance corporation without employees. In such embodiments, the specific details of the application may vary. One specific embodiment application is described herein below.

The initial application may include three eligibility questions. The questions may confirm that the applicant is currently employed, that the applicant is not self-employed, and that the applicant does not make more than $110,000 per year. If the applicant does make more than $110,000 per year, the applicant receives a salary disclaimer informing the applicant that the maximum insured salary is $110,000 USD, for example. If the other questions are answered appropriately, i.e., the applicant is employed and not self-employed, the applicant progresses to a disclaimer step. In alternative embodiments, other eligibility questions or salary limits may be used.

In the disclaimer step, the application module informs the applicant that the completeness of the applicant's reputation system profile strongly influences whether or not the application is rejected or approved. The applicant is further informed that it is in the applicant's best interest to update and improve the applicant's reputation system profile if the profile is less complete than the average reputation system profile of the applicant's peers. Finally, the applicant is informed that incomplete applications or applications including inconsistent information may be rejected. The applicant is then instructed to sign a waiver based on the presented disclaimers.

Following the initial eligibility test and the disclaimers, the applicant progresses to the main information portion of the application. In this section, the applicant may submit identity information including, for example, the applicant's name, year of birth, gender, county and city of residence, postal code, email address, reputation system profile location (such as LinkedIn or Facebook page, for example), reputation system login account information, and cryptocurrency public key. The applicant may also submit job history information including, for example, a list of the applicants employers for the last four years, a list of start and end dates for each employer, the applicant's current job title, whether the applicant's current job is salaried or hourly, the role of commission in the applicant's salary, and the applicant's current take home pay after taxes. For example, one commission related question may determine how much the applicant's pay fluctuates each month. Another commission related question may determine, if more than 50% of the applicant's salary is based on commission, whether or not the applicant is an independent agent representing a larger corporation. The application may include an additional question to confirm that the applicant's take home pay is not larger than $110,000 or some other maximum.

The application may also include honesty pledges for the applicant. For example, the applicant may be required to pledge that he or she will be honest and fair, if admitted to participate in the DAE, when performing actions for the DAE (such as HITs) and submitting claims. The application may also include a final affirmation by the applicant that the information is true and complete to the best of the applicant's knowledge. The application is submitted by the applicant and the application module receives the application data in step 202.

Following step 202, step 204 includes requesting access to the applicant's reputation system. Account access information may be provided in the application data of step 202 or may be requested separately by the application module in step 204. Step 206 includes verifying the reputation system and email of the applicant. In such embodiments, the application module initiates and confirms access to the reputation system and may send a confirmation email to the applicant. In a specific embodiment, step 206 includes sending the user an email with instructions for how to add the application programming interface (API) for the specific reputation system, such as, e.g., LinkedIn, in order to validate the applicant's reputation system. Once the applicant has followed the instructions, the application module verifies that the reputation system, e.g., LinkedIn, API has been added and verifies that the email has been validated by the applicant.

Following step 206, step 208 includes obtaining and authenticating applicant's contacts or references. For step 208, the applicant is instructed that he or she must provide five contacts from the applicant's reputation system, e.g., LinkedIn, who can confirm that applicant's status as an employed human. In specific embodiments, the applicant is instructed to interface with the DAE through a web portal or other access point, i.e., log into the application, and enter the contact emails of five peers from the applicant's reputation system. The applicant is instructed that the DAE will contact each of the references to confirm that the applicant is currently employed. In specific embodiments, step 208 may include creating an access website for applicant's contacts to log in. The DAE may create the access website and use the reputation system API to authenticate that the references or contacts are contacts from applicant's reputation system.

In step 210, the application module requests each reference's assistance in evaluating the applicant. Step 210 may include initiating contact and checking a database to confirm that each reference has not already been used by the applicant. Each reference may be sent an email requesting that the reference access the website setup by the DAE to answer a few questions about the applicant. If any of the five references has already been contacted by the DAE in reference to the applicant, the application module informs the reference that he or she has already filled out the form. If the reference is authenticated and has not been used by the applicant already, step 210 includes providing each reference contact a short questionnaire. One embodiment questionnaire may include a pledge that all responses by the reference are true and accurate and the following three questions. (1) "To the best of your knowledge is this person currently employed?" (2) "To the best of your knowledge is this person self-employed?" (3) "To the best of your knowledge does it seem reasonable that this person has been unemployed for X months (taken from application) in the last four years?" In various embodiments, these questions may be modified in various ways and may include additional questions depending on the specific application of the DAE. The application module records the reputation system profile name of each of the applicant's five references and the responses provided by each reference.

Following step 210, step 212 includes confirming that the application has been verified by the applicant's five references. If the applicant's application is verified in step 210, step 212 initiates step 214. If the applicant's application is not verified in step 210, step 212 repeats verification steps. For example, the application module may send an email to the applicant requesting completion of verification. This may include providing additional references in some embodiments. The verification process may fail if the applicant's references have already been used or if the answers provided by applicant's references do not match the information provided by the applicant in the application. If the verification process does fail, the applicant may be instructed to contact the references with updated information or provide additional references. In various embodiments, the applicant may be limited in the number of times the verification process may fail before the applicant's application to participation in the DAE is denied.

Although this particular description has indicated that five references are used, other numbers of contacts may be used in further embodiments. For example, between 3 and 7 references may be required. In alternative embodiments, less than 3 or more than 7 is also possible. In various embodiments, because the DAE is operating autonomously, particular challenges may exist in ensuring honesty of interacting humans, as described hereinabove. Thus, the DAE initiates the contact of multiple references to impose a type of social capital cost to the applicant. In such embodiments, an applicant that lies about his or her status or a fraudulent entity attempting to scam the DAE will be required to pay a social capital cost for each lie. In some embodiments, the social capital cost may be set such that the social capital cost of lying is similar in value or exceeds the value of fraudulent rewards obtained from the DAE. The inventors have particularly determined that the cost of social capital may be greater than the monetary benefits of fraud. Thus, the reference requirement may provide a mechanism to prevent certain types of fraudulent attacks, such as Sybil attacks.

Figure 12A:
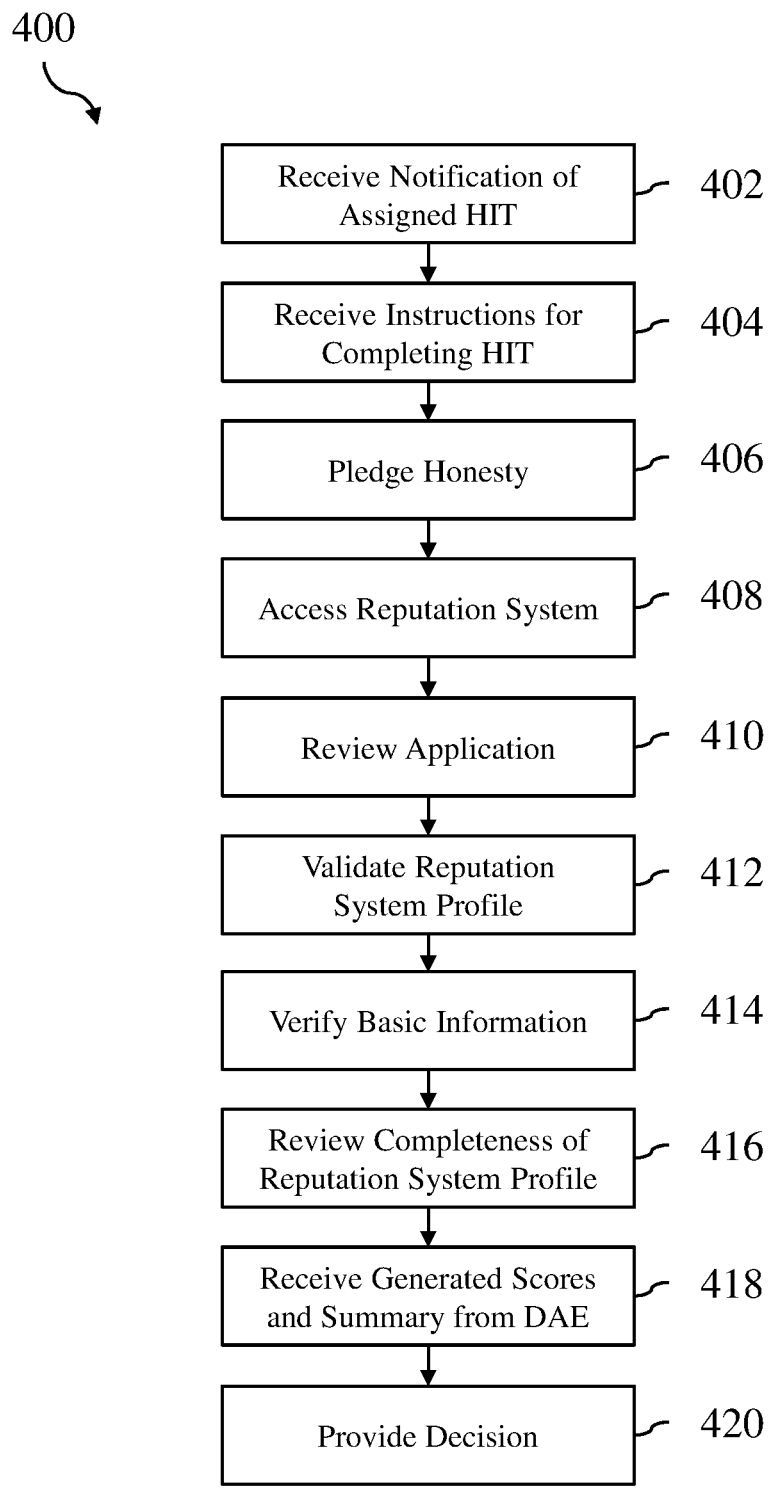

Once the application is verified by each of the applicant's references, step 214 includes initiating the new application process and the corresponding HITs associated with a new application. In such embodiments, the application module initiates the assignment of five HITs for evaluating the applicant's application. The HITs are assigned to existing participants in the DAE. Each participant that is assigned one of the five HITs is not provided information about the other HITs or participants who are completing the other HITs. The HITs may include evaluating the application, the applicant's reputation system, and recommending or not recommending admittance to participate in the DAE. Thus, the DAE may provide a specific interface to each DAE participant evaluating the application. The interface may integrate the application data and reputation system access conveniently for the DAE participant. The specific steps of an embodiment HIT for evaluating a new application are described herein below in reference to FIG. 12a and particular embodiment application grading rubrics are illustrated in FIGS. 12b and 12c.

Once the five HITs are assigned to participants in the DAE in step 214, step 216 includes confirming that each HIT is completed. Step 216 may include a 24 hour delay to allow DAE participants assigned HITs to complete the HITs. In other embodiments, the delay may be longer or shorter than 24 hours. If each HIT is completed, the application module progresses to step 220. If one or more of the HITs are not completed, the application module progresses to step 218, which includes reassigning the uncompleted HITs. In such embodiments, the uncompleted HITs may be provided to the auction module, such as described hereinabove in reference to auction module 148 in FIG. 3 and described further herein below in reference to FIG. 9. Step 216 continues to loop through reassigning uncompleted HITs and checking for completion until all five new application evaluation HITs are completed.

In various embodiments, the DAE may initiate more or less than five new application HITs. In specific embodiments, an odd number of HITs is initiated in step 214, such as three, five, or seven. In alternative embodiments, even numbers of HITs or further odd numbers of HITs may be initiated, such as one, two, four, six, or nine HITs. Further, even more HITs may be initiated, but those of skill in the art will recognize that the resource cost of operating the DAE may increase with larger numbers of HITs.

In various embodiments, steps 214 and 216 may include initiating resource payouts to DAE participants upon completion of the assigned HIT. Such resource payouts may be handled by a resource module in the DAE, such as fuel module 150 described hereinabove in reference to FIG. 3.

Following the completion of each HIT, step 220 includes determining an application score for the applicant. The score is based on the HITs of step 214 performed by the DAE participants. Step 220 may include aggregating the score provided by the DAE participants who evaluated the application. The application module may analyze the scores and check that the scores meet certain criteria. In step 222, the scores and aggregated information are compared to minimum application acceptance standards. If the scores and aggregated information meet the minimum standards, the application module progresses to step 224 to admit the applicant to participation in the DAE. If the scores and aggregated information do not meet the minimum standards, the application module progresses to step 226 to reject the applicant.

In various embodiments, step 224 includes adding the applicant to the policy holder database. The database includes all of the participants in the DAE, who may be referred to as policy holders. Step 224 may also include sending an email to the applicant confirming acceptance of the application and admittance into participation in the DAE. The email may further outline how the new participant is able to contribute to the health of the DAE and what responsibilities may be expected. Step 224 may also involve allowing the new DAE participant to setup recurring resource contributions. Specifically, as the DAE implements unemployment insurance in various embodiments, step 224 may include setup of recurring policy premium payments for use by the DAE to maintain operation. As discussed hereinabove, in various embodiments, the policy premium payments are initiated through a cryptocurrency system such as Ethereum in order to allow continued autonomous operation of the DAE.

If the scores and aggregated information are determined to not meet the minimum standards, step 226 includes rejecting the applicant. In such embodiments, the rejection may not be final. If the scores and aggregated information are above a lower minimum, the applicant may be invited to reapply once the applicant updates his or her reputation system profile. If the scores and aggregated information are below the lower minimum, the applicant may be finally rejected and not invited to reapply. In alternative embodiments, the grading criteria may use multiple cutoffs or thresholds or only a single cutoff or threshold.

Figure 7:
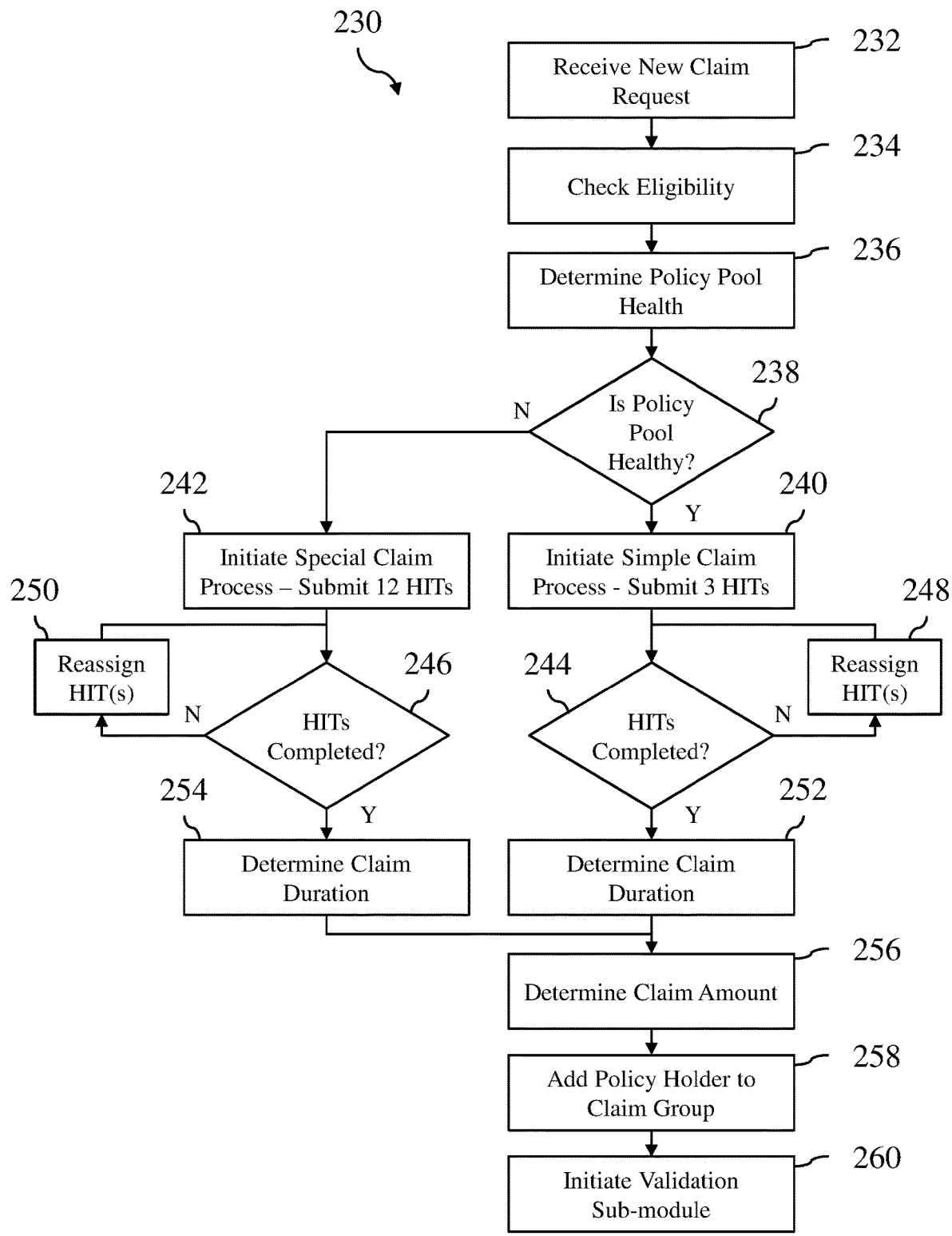
FIG. 7 illustrates a flowchart diagram of an embodiment method of operating a claim module for an embodiment modular smart contract operating in a DAE.

FIG. 7 illustrates a flowchart diagram of an embodiment method of operation 230 for a claim module for an embodiment modular smart contract operating in a DAE. According to various embodiments, method of operation 230 includes the operation of a claim module for a DAE, such as claim module 144 described hereinabove in reference to FIG. 3, which determines whether or not to approve a payout for a resource request or claim and how much to payout. In specific embodiments where the DAE implements unemployment insurance, method of operation 230 evaluates and approves or denies payouts for unemployment claims. Description of method of operation 230 is directed to a claim for unemployment insurance; however, similar steps could be executed by a DAE to perform resource allocations for other types of systems. Method of operation 230 includes steps 232-260. In such embodiments, step 232 includes receiving a new claim request from a DAE participant, referred to hereinafter as a claimant. The new claim request may include various details and information. Further, step 232 may include informing the claimant of the claim process and relevant important details.

In various embodiments, step 232 includes presenting a disclaimer to the claimant. The disclaimer may describe that there is a fee to open up a claim and that the fee is necessary to pay out a Schelling award to obtain a fair claim result. The fee to file a claim is based on the last median bid awarded during an auction multiplied by three. Further description of the Schelling point award mechanism and auctions is described further herein below. The disclaimer in step 232 may further require an honesty pledge from the claimant. The disclaimer also presents an explanation of the claim process. The claimant is informed that the maximum duration of a claim is based on the health of the policy pool and on the duration that the claimant has paid premiums to the DAE. In specific embodiments, the maximum claim duration is five months coverage if more than twelve months of premiums have been paid by the claimant, the maximum claim duration is four months coverage if more than nine months and less than thirteen months of premiums have been paid by the claimant, and the maximum claim duration is three months coverage if more than six months and less than ten months of premiums have been paid by the claimant. The maximum claim durations generally apply if the policy pool is healthy. The claimant is informed that, if the policy pool is not healthy, the maximum claim duration may be determined through a Schelling point mechanism by a number of the claimant's peers participating in the DAE.

Further, the claimant is informed that the maximum number of sick and vacation days in a claim period is limited to seven business days.

Step 232 further includes a new claim application. The new claim application may ask for information regarding a severance package, including the size in terms of months of pay of any severance package. The claimant may be required to note the termination date in the new claim application along with the date and amount of the file payment. For example, the new claim application may give the claimant the following options: (1) no check was received or check payment was less than one week of equivalent pay, (2) a check was received equivalent to one week of pay, (3) a check was received equivalent to two weeks of pay, (4) a check was received equivalent to three weeks of pay, or (5) a check was received equivalent to four weeks of pay. The claimant is informed that the first claim payout will occur the equivalent duration after the final check was received. For example, if the claimant received three months of severance pay, the first claim payout will occur three months after the final check is received. Similarly, if the claimant received a check equivalent to two weeks of pay, the first claim payout will occur two weeks after the final check.

Further, the new claim application informs the claimant that he or she must update his or her reputation system profile, such as, e.g., his or her LinkedIn profile, in order to reflect the claimant's unemployed status. The new claim application may also require the claimant to write a short statement of less than 500 characters. For example, the short statement may include the following items. First, the short statement may include a brief introduction including the type of job the claimant is seeking, the claimant's skillset, and the claimant's work history in his or her field. Second, the short statement may include the market conditions for the claimant's line of work in the claimant's geographical area, the current demand for the claimant's skillset, and the amount of competition from others having similar skillsets. Third, the short statement may include the strength of the claimant's social network to help him or her find the next job. Fourth, the short statement may include the claimant's estimation of the time required to find his or her next job. Particularly, the claim module may provide an emphasis on the importance of this estimation. Fifth, the short statement may include whether or not the claimant is planning to relocate. Finally, the short statement may include any other relevant information.

In various embodiments, the new claim application may also include a field for the claimant to estimate the number of weeks the claimant expects to spend before finding his or her next job. The new claim application may provide only options for this estimation that are below or equal to the maximum claim duration. Further, the claimant may be required to agree to contact his or her social network through the DAE and the claimant's reputation system in order to find his or her next job. In various embodiments, the claimant is required to make these contacts in order to collect on an unemployment claim. For example, the claimant may be required to make a certain number of contacts each week to continue the payout of the claim. In specific embodiments, the claimant may be required to contact eight contacts from the claimant's reputation system during the first week. For the weeks after the first week, the claimant may be required to contact eight plus n contacts from the claimant's reputation system, where n is the number of weeks after the first week. In such embodiments, if the claimant fails to contact the specified number of contacts, the claim payout may be suspended until the specified number of contacts is achieved. Further, the new claim application may also require the claimant to agree to use his or her reputation system through the DAE in order to verify the start date of his or her next job. The claimant may be required to agree to this as a requirement to collect on an unemployment claim.

After the new claim application is received in step 232, step 234 includes checking the eligibility of the claimant. Step 234 may specifically include determining if the claimant's policy is older than six months, i.e., the claimant has paid premiums for a minimum of six months. If the claimant has not paid a minimum of six months of premiums, the claimant is not eligible and the claim is denied. Further, step 234 includes checking if the claimant has opened a claim previously. If the claimant has not opened a claim previously, the claimant is eligible to open a claim. If the claimant has opened only one claim previously, the claimant is eligible to open the present claim, i.e., the second claim, if the previous claim, i.e., the first claim, ended two years before the filing of the present claim. If the claimant has opened more than one claim previously, the claimant may only be eligible to open the present claim if the previous claim ended four years before the filing of the present claim. In such embodiments, if not enough time has passed since a previous claim, the claimant is presently ineligible to open the new claim. If the claim module determines that the claimant is ineligible, the claimant is informed of the ineligible status of the claimant's policy and the claim is closed.

If step 234 determines that the claimant is eligible to open a claim, step 236 follows and includes determining the health of the policy pool. In various embodiments, determining the health of the policy pool in step 236 may include any number of calculations.

One specific embodiment policy pool health calculation is described herein. The maximum number of days for the claimant's claim TC_max is based on the number of months that the claimant has made premium payments N_pay. Specifically, the maximum number of claim days TC_max is given by the equation $$TC_{max} = \begin{cases} 0 & \text{if N\_pay} <= 6; \\ 90 & \text{if N\_pay} > 6; \\ 120 & \text{if N\_pay} > 9; \\ 150 & \text{if N\_pay} > 12. \end{cases}$$

The projected overhead for the year E_yr is calculated using the previous month's operation cost E_month and the dividend payout E_div if paid at the time of the calculation, where the dividend payout E_div is calculated by dividend module 152 described hereinabove in reference to FIG. 3 and described further herein below in reference to FIG. 10. The specific equation for the projected overhead E_yr is E_yr=E_month*12+E_div.

The number of claim days already awarded, on average, per claimant TC_award is equal to the total number of claim days for all claimants TC_all divided by the total number of claimants NC_all, i.e., TC_award=TC_all÷NC_all. Then, a value referred to as the claim increase factor, C_inc may be calculated using the equation $$C\_inc = \frac{8\%}{UE\_curr} \cdot \frac{TC\_max}{TC\_award} \cdot EC\_month,$$

where UE_curr is the current unemployment rate, EC_month is the total paid out in claims for the previous month, and 8% is the baseline unemployment rate used. Then, using the claim increase factor C_inc, the total number of premiums paid in for the previous month EP_month, and the projected overhead E_yr, the policy pool health P_health is calculated using the equation $$P\_health = EP\_month - C\_inc - \frac{E\_yr}{12}.$$

If the calculated policy pool health P_health is greater than or equal to 1, the policy pool is considered to be healthy. If the policy pool health P_health is not greater than or equal to 1, the total premium pool EP_pool is considered. The number of months until the policy pool is exhausted TP_exhaust is calculated by dividing the total premium pool EP_pool by the policy pool health P_health. If the number of months until the policy pool is exhausted TP_exhaust is greater than or equal to 24, the policy pool is considered healthy. In some embodiments, the baseline unemployment rate of 8% may be other values, for example. In one embodiment, the DAE may use oracles, i.e., data feeds which allow agents operating on a blockchain to obtain information from the outside world, to determine current unemployment rates in, for example, the US, Europe, and Canada, and increase the determined unemployment rate by ¼ to get a new baseline. For example, if the average unemployment in major world markets is 8%, the baseline used would be 10%.

In various embodiments, based on the determination of the policy pool health in step 236, step 238 progresses to step 240 if the policy pool is healthy and to step 242 if the policy pool is not healthy. If the policy pool is healthy, step 240 initiates a simple claim process and assigns three HITs to complete the simple claim process. In various embodiments, the simple claim process recommends the maximum claim duration to each DAE participant performing one of the three HITs. Each of the three DAE participants then provides a recommendation for the claim duration. Further description of a simple claim HIT is provided herein below in reference to FIG. 13. Step 244 checks if each of the three HITs is completed. Step 244 may include a delay of, for example, 24 hours to allow DAE participants to complete the three HITs. If all three of the HITs are completed, step 252 follows and includes determining the claim duration. If one or more of the HITs is uncompleted, step 248 follows step 244 and includes reassigning the uncompleted HITs. In such embodiments, the uncompleted HITs may be provided to the auction module, such as described hereinabove in reference to auction module 148 in FIG. 3 and described further herein below in reference to FIG. 9. Step 244 continues to loop through reassigning uncompleted HITs and checking for completion until all three simple claim HITs are completed. In various embodiments, step 252 includes determining the duration of the claim based on the three completed HITs from steps 240 and 244.

If the policy pool is not healthy, step 242 follows step 238. In various embodiments, step 242 includes initiating a Schelling claim process and assigning twelve corresponding HITs to complete the Schelling claim process. In various embodiments, the Schelling claim process involves using a Schelling point mechanism with the twelve DAE participants assigned the twelve corresponding HITs participating in the Schelling point mechanism in order to determine a fair claim duration for the claimant. Further description of a Schelling claim HIT is provided herein below in reference to FIG. 14. Step 246 checks if each of the twelve HITs is completed. Step 246 may include a delay of, for example, 24 hours to allow DAE participants to complete the twelve HITs. If all twelve of the HITs are completed, step 254 follows and includes determining the claim duration. If one or more of the HITs is uncompleted, step 250 follows step 246 and includes reassigning the uncompleted HITs. In such embodiments, the uncompleted HITs may be provided to the auction module, such as described hereinabove in reference to auction module 148 in FIG. 3 and described further herein below in reference to FIG. 9. Step 246 continues to loop through reassigning uncompleted HITs and checking for completion until all twelve Schelling claim HITs are completed. In various embodiments, step 254 includes determining the duration of the claim based on the result of the Schelling point mechanism performed in the twelve HITs from steps 242 and 246.

In various embodiments, steps 240 and 244 or steps 242 and 246 may include initiating resource payouts to DAE participants upon completion of the assigned HIT. Such resource payouts may be handled by a resource module in the DAE, such as fuel module 150 described hereinabove in reference to FIG. 3.

After the duration of the claim is determined in step 252 or step 254, step 256 includes determining the claim payout amount. In such embodiments, the claim payout amount EC_out is determined based on the monthly premium paid in by the claimant. The following is a specific embodiment calculation performed by the claim module in order to determine the claim payout amount EC_out. The claim payout amount EC_out is determined in terms of a monthly payout and is based primarily on the claimant's monthly premiums paid in. If the number of months the claimant has paid in a premium is greater than or equal to twelve, then the average premium paid in EP_avg is calculated as the sum EP_sum of all the claimant's twelve previous premium payments divided by 12, i.e., EP_avg=EP_sum÷12. If, on the other hand, the number of months the claimant has paid in a premium is less than twelve, then the average premium paid EP_avg is calculated as the average of all the claimant's premium payments, i.e., EP_avg is calculated as the sum EP_sum of all the claimant's premium payments divided by the number of payments. Based on the average premium paid EP_avg, the monthly salary percentage SM_percent is calculated as the average premium paid EP_avg divided by the monthly take home pay SM_pay, i.e., SM_percent=EP_avg÷SM_pay. Then, an unemployment insurance multiplier UIX is determined based on the monthly salary percentage SM_percent according to the following, $$UIX = \begin{cases} 8 & \text{if } 6\% \geq \text{SM\_percent} \geq 3.01\%, \\ 9 & \text{if } 3\% \geq \text{SM\_percent} \geq 1.01\%, \\ 10 & \text{if } 1\% \geq \text{SM\_percent} \geq 0.01\%. \end{cases}$$

Finally, the monthly claim payout amount EC_out is equal to EP_avg multiplied by UIX, i.e., EC_out=EP_avg·UIX.

In various embodiments, following step 256, step 258 includes adding the policy holder to a claim group that includes all claimants currently receiving unemployment claim payouts. After determining the duration of the claim period for the claimant in step 252 or 254, determining the claim payout amount EC_out for the claimant in step 256, and adding the claimant to the claim group in step 258, the DAE will continue to initiate unemployment claim payouts until the claimant finds a new job or reaches the maximum number of claim days TC_max so long as the claimant continues to provide validation. Thus, the final step of method of operation 230, step 260, includes initiating a validation sub-module in order to continuously validate the claimant's status and activity.

Figure 8:
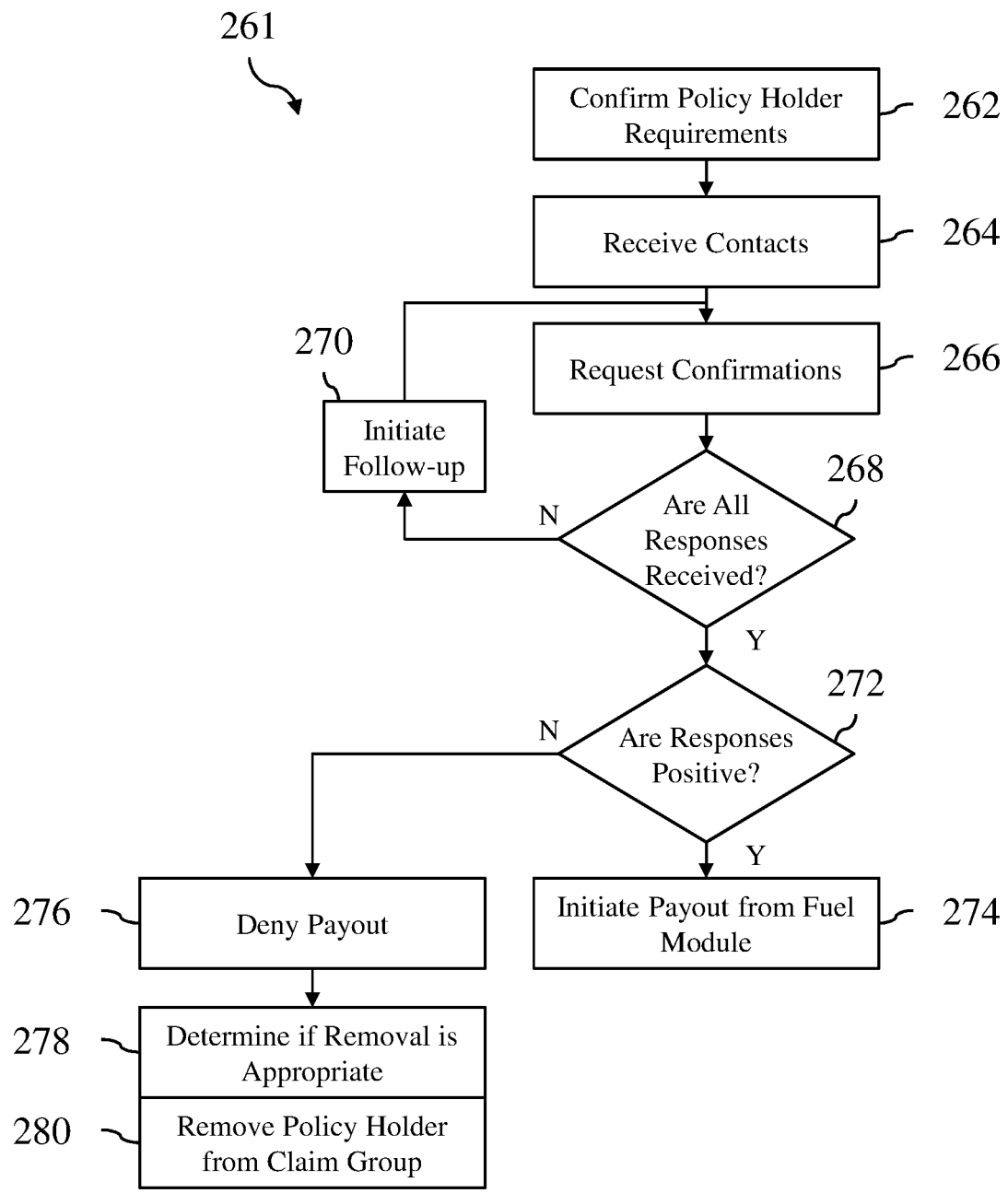
FIG. 8 illustrates a flowchart diagram of an embodiment method of operating a validation sub-module of the claim module for an embodiment modular smart contract operating in a DAE.

FIG. 8 illustrates a flowchart diagram of an embodiment method of operation 261 for a validation sub-module of the claim module for an embodiment modular smart contract operating in a DAE. According to various embodiments, method of operation 261 includes the operation of a validation sub-module of the claim module for a DAE, such as a sub-module of claim module 144 described hereinabove in reference to FIG. 3. The validation sub-module monitors the activity of a participant in the DAE with an accepted resource request and confirms the continued allocation of resources through the expenditure of the participant's social capital to confirm or encourage honesty. In specific embodiments where the DAE implements unemployment insurance, method of operation 261 monitors the activity of a claimant with an approved unemployment claim in order to confirm continued eligibility of the claimant to collect on the unemployment claim payouts. Description of method of operation 261 is directed to a claim for unemployment insurance; however, similar steps could be executed by a DAE to perform resource allocations for other types of systems.

In a specific embodiment, claim payouts may be executed in a manner having a number of specific features. For example, claim payouts may be made during any given week based upon two rules. The first rule may specify that the claimant can collect on a claim as often as once per day, but the claimant can never collect claim payouts for future time. The claimant can only collect money that is available for claim payout up to the present day. The second rule may specify that the claimant can only collect claim payouts for weeks that have completed the validation assignment for that week, including the first week. Thus, the claim validation sub-module may operate according to method of operation 261 to confirm that the claimant has completed the appropriate validation assignments.

In various embodiments, step 262 includes confirming that the policy holder, i.e., the claimant, meets the proper requirements. This may include, for example, confirming that the claimant has recently logged into a claim portal operated by the DAE. In a specific embodiment, a claimant is required to log into the claim portal once each week. If the claimant fails to log in for eight days, the claimant's claim payout is suspended. If the claimant fails to log in for twelve days, the claimant's claim payout is cancelled. Thus, step 262 includes confirming that the claimant has logged into the claim portal and that the maximum claim duration has not been extended.

Once the claimant has accessed the DAE through the claim portal in step 262, step 264 includes requesting and receiving the claimant's contacts or references from the claimant's reputation system, such as LinkedIn, for example. In the claim validation process, the claimant may be required to use what is referred to as social capital in order to receive claim payments. Specifically, in such embodiments, the claimant provides a number of references or contacts from the claimant's reputation system who are able to confirm that the claimant is unemployed. In various embodiments, when a claimant spends social capital from his or her reputation system and social network, the DAE is simultaneously able to deter fraud and shorten time that the claimant spends unemployed because it enables the DAE to impose a liar cost for fraudulent claims while facilitating a genuine claimant to more easily leverage his or her social network and reputation system to obtain another job. In such embodiments, the DAE is able to verify a claimant's employment status by initiating the claimant's social network through the claimant's reputation system to pledge its support for the recipient and affirm its willingness to assist the recipient to find a new job. In some embodiments, this may also motivate a claimant to increase his or her social network in order to continue collecting on a claim.

In various embodiments, step 264 requests a specific number of references from the claimant. In a specific embodiment, the claimant is asked to provide 7+N references, where N is the number of weeks into the claim period. For example, in the first week of the claim, the claimant may provide eight references to the DAE in order to collect the claim payout. In the second week of the claim, the claimant may provide nine references to the DAE in order to collect the claim payout. In the third week of the claim, the claimant may provide ten references to the DAE in order to collect the claim payout. Thus, the number of references from claimant's social network may increase each week that the claimant is unemployed. In further embodiments, the base number of references may be modified to include any number.

Further, in some embodiments, once a reference from the claimant's reputation system has been contacted by the DAE to confirm the claimant's unemployed status and has validated the claimant's status, the reference may not be contacted again for a period of time. In one specific embodiment, the reference may not be contacted again for three months. Other time periods may be used in other embodiments.

Step 266 includes contacting the references provided by the claimant. In various embodiments, the references may be contacted by the DAE through the reputation system or through email using an automated system message. Further, the claimant may also contact the references he or she provided to the DAE before the DAE contacts each reference in order to inform him or her of the expected contact from the DAE and that the claimant is still seeking a new job. In some embodiments, the claimant may also use the opportunity ask each reference for any recommendations related to any job opportunities the reference is aware of.

In various embodiments, the DAE contacts each reference provided by the claimant with a short message informing the reference of the claimant's status and requesting validation by the reference. In a specific embodiment, the DAE may ask each reference to validate that the claimant is still seeking a new job and inform the reference that unemployment claims are withheld until the references confirm the claimant's unemployed status. In such embodiments, if a reference is not willing to help or aware of the claimant's actual status, the DAE may initiate follow-up from the claimant or provide further contact information for the claimant in order to allow the reference to confirm directly with the claimant before providing a response. The DAE may also ask each reference if he or she is able to help the claimant find a new job. The DAE may also provide each reference an opportunity to send a message directly to the claimant. For example, the reference may provide a word of encouragement or advice. As a final note, the DAE may include a brief marketing note, providing each reference a link or other resource to learn more about the specific DAE in which the claimant is participating. In such embodiments, the validation process operated by the DAE further serves to increase awareness of the DAE while preventing fraud and aiding in the unemployed participant's, i.e., the claimant's, job search by increasing the communication with the claimant's social network through the claimant's reputation system. In a specific embodiment, the DAE operates primarily with LinkedIn; however, other reputation systems are possible, such as Facebook, for example, and may be selected based on the type of DAE and the participants in the DAE.

In various embodiments, the identity of each reference may be confirmed by using the claimant's reputation system, e.g., LinkedIn. Thus, as described hereinabove, the DAE may contact each reference through the reputation system or through email, but the reference may be directed to interact with the DAE by first confirming his or her identity through the reputation system. The DAE may also provide a specific validation web portal, for example, that the reference can access after confirming his or her identity. The validation web portal may provide the instructions and questions for each reference described hereinabove.

Once all the references have been contacted, step 268 includes confirming that all the responses have been received. If all of the responses have not been received by the DAE, step 270 follows step 268 and includes initiating follow-up with each reference. For example, the claimant may be notified that specific references have not responded. Thus, the claimant may initiate follow-up with an individualized note or a standard general note. The DAE may also send a general follow-up message. In some embodiments, the claimant may also be provided an opportunity to provide alternative references if some references are not responsive. The new references are then contacted in step 266. In various embodiments, steps 268 and 270 continue to loop until the minimum number of responses has been received from the references.

In various embodiments, the claimant may initiate contact directly and through the DAE with more than the minimum number of required references in order to leverage the claimant's social network to obtain a new job. In such embodiments, the additional references contacted beyond the minimum number of required references may not count as future credits to be used for validating future weeks. In a specific embodiment, validation credits from references earned on Friday, Saturday, or Sunday count toward the next week once the quota for the current week has been filled. In other embodiments, determining the specific timeline and number of validation credits awarded for the claimant's references may vary.

Once all of the references' responses are received in step 268, step 272 includes confirming that each response is positive, i.e., that each reference has validated the unemployed status of the claimant. If all the responses are positive, step 274 follows and includes initiating the unemployment claim payout from a resource module, such as fuel module 150, to the claimant. In such embodiments, the fuel module includes access to the resources of the DAE and, based on the instructions received from the validation submodule in the claim module, initiates a transfer of resources to the claimant. In specific embodiments, the DAE operates using a cryptocurrency on a decentralized blockchain platform, such as on the Ethereum platform. Thus, step 274 includes initiating the fuel module 150 to authorize a cryptocurrency transfer to the claimant for the payout of unemployment insurance.

If all the responses are not positive, step 276 follows and includes denying the payout of the claim. Step 278 includes determining if removal of the claimant from the claim group is appropriate. For example, step 278 may initiate a follow-up with the claimant requesting confirmation of the claimant's unemployed status and a request to follow-up with the claimant's references to inform each reference of the claimant's unemployed status. The claimant may also be asked to complete the validation process again. In such embodiments, the claimant may be required to follow-up with the references who noted that the claimant is still employed. In other embodiments, the claimant may be required to provide a whole new set of references. In still further embodiments, the claimant may be asked to provide multiple references for each reference that did not validate the claimant's unemployed status. For example, the claimant may provide three references for each reference that did not validate the claimant's unemployed status. In still other embodiments, the claimant may only provide a single new reference for each reference that did not validate the claimant's unemployed status.

In various embodiments, if the claimant has repeatedly failed to provide references who can confirm that the claimant is unemployed, step 278 may include determining that the claimant is not eligible to receive unemployment claims and removal from the claim group is appropriate. In another embodiment, if all or some number in the majority of the claimant's references fail to validate that the claimant is unemployed, step 278 may include determining that removal from the claim group is appropriate. In still another embodiment, if a significant period of time has passed during which claimant has not been able to validate his or her unemployed status through the references provided, step 278 may include determining that removal from the claim group is appropriate. For example, if the claimant is not able to validate his or her unemployed status through the references provided for more than two weeks, removal from the claim group may be appropriate. Based on the determination of step 278, step 280 includes removing the policy holder, i.e., the claimant, from the claim group.

In various embodiments, method of operation 261 for the validation sub-module may be repeated each time the claimant accesses the DAE in order to collect a claim payout. Thus, method of operation 261 may be repeated, for example, weekly.

Figure 9:
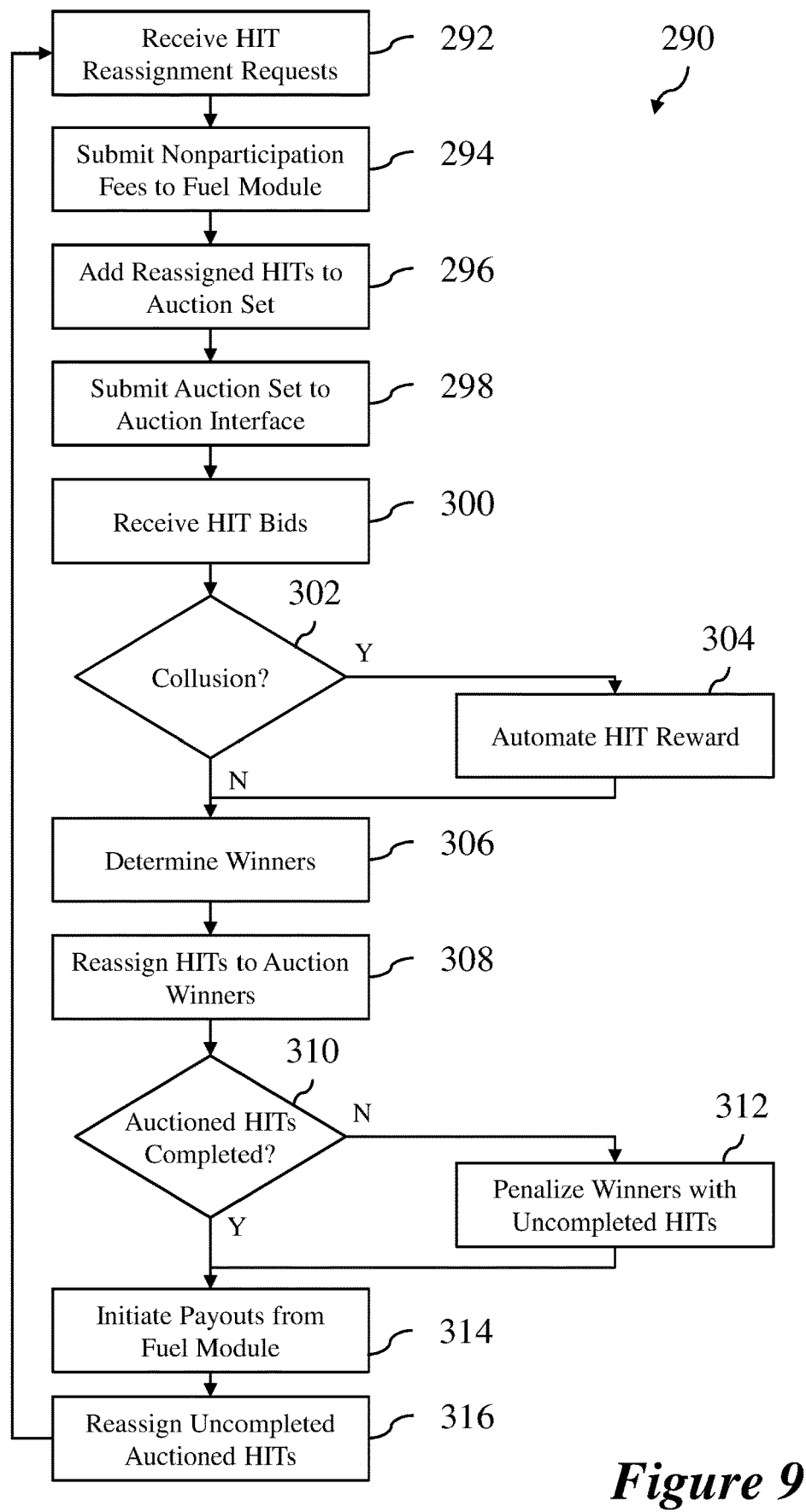
FIG. 9 illustrates a flowchart diagram of an embodiment method of operating an auction module for an embodiment modular smart contract operating in a DAE.

FIG. 9 illustrates a flowchart diagram of an embodiment method of operation 290 for an auction module for an embodiment modular smart contract operating in a DAE. According to various embodiments, method of operation 290 includes the operation of a scheduling and reassignment module for a DAE, such as auction module 148 described hereinabove in reference to FIG. 3, which determines how to reassign and reward HITs for the DAE. In specific embodiments where the DAE implements unemployment insurance, method of operation 290 reassigns the various HITs related to evaluating new policy applications and new claims. Description of method of operation 290 is directed to tasks related to unemployment insurance; however, similar steps could be executed by a DAE to perform task reassignment and reward allocation for other types of systems. Method of operation 290 includes steps 292-316.

According to various embodiments, each type of HIT is assigned to a participant in the DAE when the DAE encounters tasks that may include HITs. Different HITs for some specific embodiments are described further herein below in reference FIGS. 12a, 12b, 12c, 13, and 14. Once the task is assigned to a DAE participant, referred to hereinafter as an assignee, the assignee accesses a web portal operated by the DAE for the completion of the HIT. In such embodiments, the assignee has 24 hours to complete the assigned HIT. If the HIT goes uncompleted for 24 hours, the DAE may reassign the HIT via the auction module, such as auction module 148 in FIG. 3, and initiate method of operation 290.

In various embodiments, step 292 includes receiving HIT reassignment requests. For example, claim module 144 or new policy module 140 may initiate HIT reassignments, as further described hereinabove in reference to FIGS. 6 and 7. Once the HIT reassignment requests are received, step 294 includes submitting nonparticipation fees to the fuel module. In such embodiments, because the original assignees of the HIT failed to complete the HIT on time, a fee is applied to the original assignee for his or her failure to contribute to the operation of the DAE. Such fees may be applied through the fuel module.

In various embodiments, step 296 includes adding the reassigned HITs to the auction set. For example, auctions may occur during auction windows at 10 pm CET, 10 pm EST, and 10 pm PST, for example. In other embodiments, other auctions at other times may be included. In step 296, the Reassigned HITs may be added to the next available auction. Step 298 includes submitting the auction set to an auction interface or web portal provided by the DAE. At the time of the auction, participants in the DAE access the DAE through the auction web portal in order to place bids on the different HITs available. In specific embodiments, there may be multiple types of HITs available including new application HITs (for the application module), simple claim process HITs (for the claim module), and Schelling claim process HITs (for the claim module. Further, some embodiments may include HITs for extending claim periods beyond the maximum duration. The DAE participants who are placing bids, referred to hereinafter as bidders, are informed that the reward for the Schelling claim process HITs is dependent on how he or she participates in the Schelling point game and that he or she may or may not receive the specific reward based on his or her participation.

In various embodiments, step 300 includes receiving the bids from the bidders. In a specific embodiment, there may be a number of auction rules associated with the auction. Specifically, the bidders request to perform from 1 to 4 HITs and submit a bid of the price at which the bidder will complete each HIT. Each bidder is not allowed to request more than four tasks during any one auction period. In other embodiments, the bidder may be allowed to request more than four tasks. In some embodiments, if the bidder is made an offer for completing HITs after the auction, the auction award value applies to all of the tasks requested by the bidder, i.e., the bidder is paid the same amount, equal to the auction award value determined during the auction, for each of the 1 to 4 tasks. During the auction, any tasks that do not get assigned in the current auction are moved to the next available auction. The auction opens to accept bids for 15 minutes and no bids are accepted outside of the auction window. Further, each bidder is given only two hours to complete any HITs that are assigned to him or her after the auction. If the bidder does win an auction for HITs and does not complete the reassigned HITs in the two hour time frame, the bidder is fined the amount equal to the auction award for each uncompleted HIT and the uncompleted HIT is again submitted to the auction module for further reassignment in the next auction. Further, HITs are assigned with a first in first out queue. In various embodiments, these auction rules may be modified with different details or timeframes in other embodiments.

In further specific embodiments, each bid is submitted to the auction module according to a hashing protocol. In such embodiments, the hashing protocol prevents bidders from cheating by looking at what other bidders have guessed. Instead of a bidder submitting a bid directly to the DAE, a bidder submits a hash of the bid, a time stamp, and a random word to the DAE. 15 minutes later the bidder submits the un-hashed answer to the DAE. As the DAE may operate on a publically available and transparent blockchain, each bid submitted to the DAE may be publically available. Using a hash commits the bidder to a specific bid at a specific time, which, in combination with the Schelling type mechanism used to fairly determine the value of the auction award, keeps the auction award fair. One specific sequence for the hashing protocol may include submitting a hash of the bid plus a timestamp plus a random word to the DAE, e.g., on the block chain, prior to the end of the auction. At the end of the auction, in order to verify the previous bid, submit the un-hashed bid, the timestamp, and the random word. The auction module will then hash the winning guesses in order to verify that the winners did not cheat.

After receiving bids in step 300, step 302 includes checking for collusion in the auction. For example, if it appears that the bidders are working together by all bidding in a consistent manner and higher than typical previous averages, collusion is detected and step 304 follows step 302. Step 304 includes overriding the bids submitted and automating the auction award. In such embodiments, automating the auction award generates an award which is relative to the average award offered from the previous ten auctions. Such automation creates a ceiling which caps the maximum size of an auction award and may help mitigate the effects of collusion. If no collusion is detected, step 306 follows step 302.

Step 306 includes determining the winners of the auction. In a specific embodiment, determining the winning bids may include a number of steps according to the following. After all the bids are submitted, the median bid MedX is chosen as the auction award. The median bid MedX is compared with the average of the last ten bids AveX and, if the median bid MedX is greater than 150% of the average, i.e., MedX>1.5·AveX, then the auction award is set to 1.5·AveX, i.e., the median bid MedX is set to 1.5·AveX.

Step 308 includes reassigning HITs to auction winners. If the auction award is set to MedX=1.5·AveX, the auction module offers bidders the new MedX as the auction award for HITs starting with the lowest bidder and moving to the highest bidder. For example, the bidder with the lowest bid receives his or her requested number of HITs, then the second lowest bidder, then the third, etc., until all of the HITs are reassigned. If the auction award is set to the median bid MedX of the current auction, i.e., median bid MedX is not greater than 150% of average of last ten bids AveX, then the HITs are assigned to bidders with bids closest to the median bid MedX first and to bidders with bids progressively further from the median bid MedX. In such embodiments, each bidder awarded any HITs is offered the auction award of MedX for each HIT. In order to determine which bidder is reassigned a HIT in the case of a tie bid, the bidder requesting more HITs receives the HIT. Further, random selection may also be used in addition when tie bids are present.

In various embodiments, during step 308, a bidder who is to be reassigned a HIT has the opportunity to reject the offer before he or she is reassigned the HIT. Once the bidder accepts the offer, he or she is committed to finishing the HIT for the MedX auction award. If the bidder rejects the offered HIT or HITs, the HIT or HITs are offered to next most eligible bidder.

Following reassignment of the auctioned HITs, step 310 includes checking for the completion of each reassigned HIT. For example, the auction module may check after two hours if the reassigned HITs are completed. If all the HITs were completed, step 314 follows immediately after step 310, otherwise, step 312 follows step 310. Step 312 includes penalizing auction winners with uncompleted reassigned HITs. If an auction winner who had a HIT or HITs from the auction reassigned to him or her fails to complete the HIT, the auction winner is penalized the amount of the auction award MedX for each uncompleted HIT. Thus, step 312 may include submitting fees equal to MedX multiplied by the number of uncompleted HITs for the particular DAE participant. As described hereinabove in reference to step 294, the auction module may submit the fees to the fuel module.

Step 314 includes initiating payouts from the fuel module for completed HITs. The payouts are initiated in the amount of the auction award MedX and applied for each completed HIT. Thus, an auction winner who completes four HITs receives four times the auction award MedX. The fuel module, such as fuel module 150 described hereinabove in reference to FIG. 3, executes the auction award payouts to each DAE participant. In step 314, no payouts are initiated for the uncompleted HITs reassigned to and accepted by auction winners. As described in reference to step 312, the auction winners with uncompleted HITs after the timeframe will be penalized with fines equal to the auction award for each uncompleted HIT.

In various embodiments, all fees for abandonment or reassignment due to non-participation are added to DAE participant's account and the DAE participant is informed of accumulated fees at the time of his or her next premium payment. Fees are deducted from the DAE participant's premium before any premium dollars are applied to his or her account.

In various embodiments, the DAE may include a policy pool and a reserve pool for paying out auction awards. All fees collected are placed in the reserve pool while all premium payments are placed in the policy pool. In various embodiments, if the reserve pool approaches zero, then the fuel module may transfer sufficient resources, such as ether for an Ethereum DAE, from the policy pool to the reserve pool in order to pay awards for the next 21 auctions. In other embodiments, the fuel or resource module may maintain resources according to other divisions and may allocate resources in larger or smaller amounts.

Following step 314, step 316 includes reassigning the uncompleted HITs. Thus, step 316 submits the uncompleted HITs back into the initial stage described in reference to step 292 and the process repeats for the next auction.

In various embodiments, the auction module may also analyze the behavior of the various bidders in order to determine if a given DAE participant may be classified as a bad bidder. In such embodiments, if a bidder repeatedly does not complete reassigned HITs after winning an auction or the HITs completed by the bidder have information that is most often different from the other HITs for the same task, the bidder may be classified as a bad bidder. A bad bidder may receive fees if his or her behavior is not rectified.

In various embodiments, the DAE may police the activities of the participants in the DAE according to a number of approaches. The DAE may allow honest DAE participants to move the median auction award downward by joining an auction, bidding with no intent to complete a HIT, and rejecting an offer for a reassigned HIT. The honest DAE participants may attempt to move the median auction award downward if they find that auction awards are excessive.

The DAE may also charge a small fee for placing bids if high abandonment rates become a problem. Further, if the new MedX is set to 1.5·AveX for the auction award and the DAE determines that the new MedX has also been adjusted to 1.5·AveX in any of the past ten auctions, the DAE may issue a warning to bidders that collusion to adjust bids upwards is not considered acceptable to DAE and participants in the DAE, and, if the maximum increase in auction award occurs again in the coming auctions, a nonrefundable fee of AveX·0.1 will be imposed to bid in the next 3 auctions. In such embodiments, the DAE may continue to monitor the auction award and, if the auction award is adjusted to 1.5·AveX more than two times in a period of ten auctions, warn auction bidders at the start of the next auction that collusion to adjust bids upwards is not considered acceptable behavior and if it happens again a nonrefundable fee of AveX*0.1 will be imposed to bid in the next 3 auctions. In either situation, the DAE may initiate such nonrefundable fees for bidding if the auction awards continue to increase inappropriately.

Figure 10:
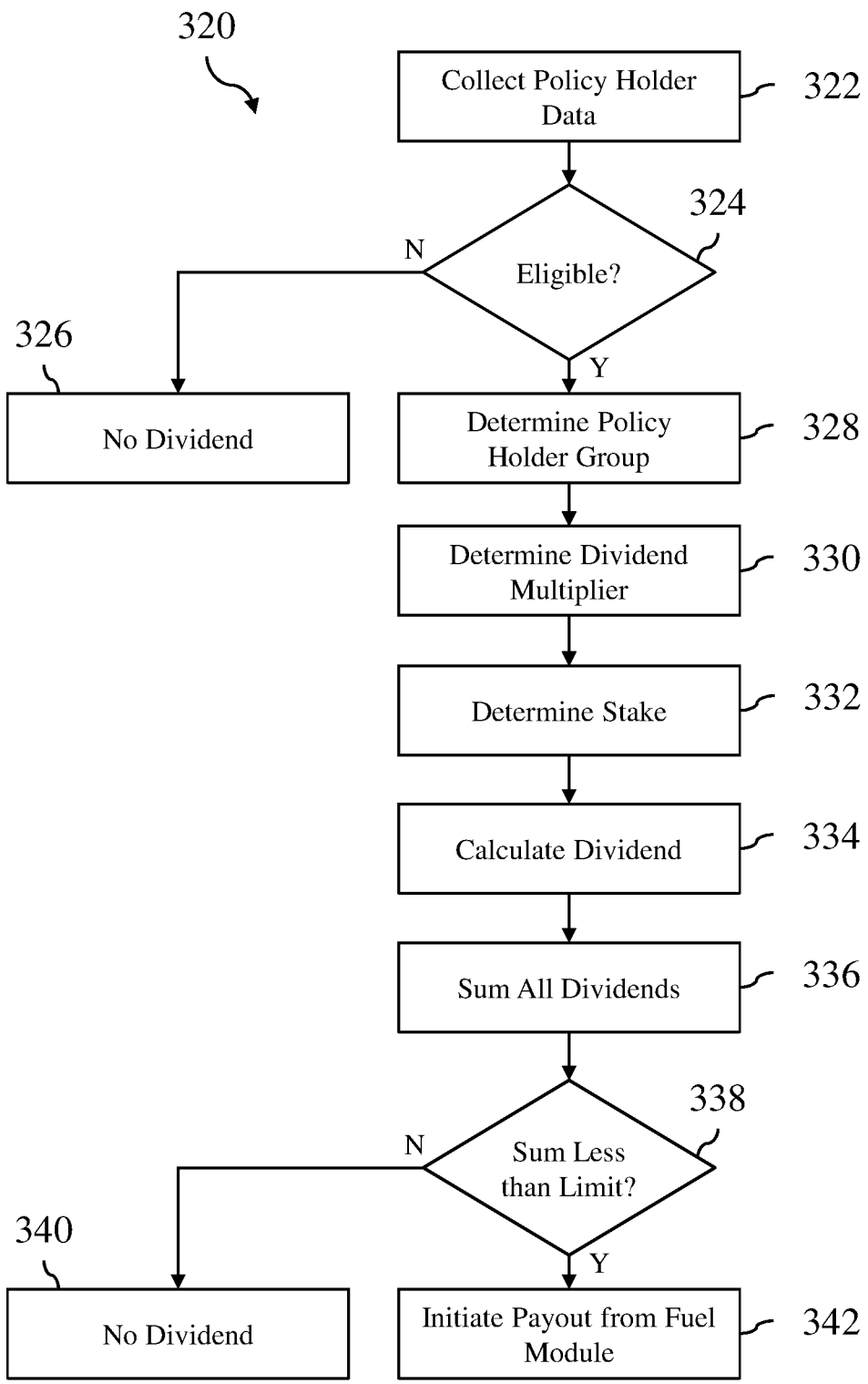
FIG. 10 illustrates a flowchart diagram of an embodiment method of operating a dividend module for an embodiment modular smart contract operating in a DAE.

FIG. 10 illustrates a flowchart diagram of an embodiment method of operation 320 for a dividend module for an embodiment modular smart contract operating in a DAE. According to various embodiments, method of operation 320 includes the operation of a participation reward module for a DAE, such as dividend module 152 described hereinabove in reference to FIG. 3, which determines how to fairly payout dividends for participation in the DAE. In specific embodiments where the DAE implements unemployment insurance, method of operation 320 determines fair dividends based on each DAE participants premium payments and the overall policy pool. Description of method of operation 320 is directed to tasks related to unemployment insurance; however, similar steps could be executed by a DAE to determine ownership shares or participation rewards for other types of systems. Method of operation 320 includes steps 322-342.

In various embodiments, the DAE incentivizes participation by paying out dividends as a form of percentage of ownership to DAE participants. In some embodiments, this contributes to the autonomous nature of the DAE by creating non-controlling advocates and participants who receive the primary benefit of the DAE's continued function and success by reaping percentages of the excess resources gained by the DAE through operation. In such embodiments, the dividend module in the DAE may incentivize early participation in the DAE by awarding early DAE participants with greater dividend payouts. Further the dividend module may reward DAE participants who participate for an extended periods of time with larger lump sum dividend payouts as an incentive for participants to invest a greater amount of time into the DAE.

In some embodiments, the dividend module is configure to avoid paying dividends to DAE participants who participate for shorter periods of time in order to shift greater ownership to long term DAE participants. The claim module may pay smaller dividends and larger claim payouts to DAE participants who pay smaller premiums in order to differentiate between DAE participants whose goal it is to collect dividends and DAE participants whose goal it is to collect on claims. In some embodiments, the dividend module may payout dividends only to DAE participants who have participated in the DAE for more than twelve months. Further, the dividend module may payout dividends once a year on a specific dividend date, for example. Thus, new participants in the DAE typically wait approximately 18 months before receiving a first dividend payout from the dividend module.

In various embodiments, DAE participants are added to groups based on the date that each participant is accepted into participation with the DAE. For example, all participants in the DAE who join before the first dividend date are in group 1, all participants in the DAE who join after the first dividend date and before the second dividend date are in group 2, etc. In such embodiments, the first dividend date may be selected based on the initiation of the DAE. In some embodiments, the dividend dates are arranged yearly. In other embodiments, the dividend dates may be arranged more or less frequently, such as every six months or every other year, for example.

Thus, method of operation 320 for the dividend module, such as dividend module 152, begins with step 322, which includes collecting DAE participant, referred to hereinafter as a policy holder, data. Step 324 includes checking if each policy holder is eligible to receive a dividend. Each policy holder that is not eligible is handled in step 326, where no dividend is paid out. Each policy holder that is eligible for a dividend is handled in step 328, which includes determining the policy holder group. As described briefly hereinabove, depending on when a participant, i.e., policy holder, begins to participate in the DAE, the policy holder is added to a different group. Step 328 determines the appropriate group for each policy holder that is eligible to collect a dividend.

In various embodiments, step 330 includes determining a dividend multiplier DM. The dividend multiplier may be determined based on the percentage of pay the policy holder contributes through premium payments each month. In such embodiments, the higher the percentage of the policy holder's monthly pay that is paid in each month as his or her premium, the higher the dividend multiplier DM. In some embodiments, the dividend multiplier DM may range from 0.5 to 1.5 and be based on premium percentages of the policy holder's pay ranging from 0% to 10%, as described hereinabove in reference to the monthly salary percentage SM_percent. The equation below illustrates a specific example embodiment.

$$DM = \begin{cases} 1.1 & \text{if } 5\% \leq \text{SM\_percent} \leq 6\% \\ 0.9 & \text{if } 3\% \leq \text{SM\_percent} \leq 4.99\% \\ 0.75 & \text{if } 1\% \leq \text{SM\_percent} \leq 2.99\% \\ 0.6 & \text{if } 0.01\% \leq \text{SM\_percent} \leq 0.99\% \end{cases}$$

In such embodiments, such particular values of the dividend multiplier serve as a way for the participants in the DAE to self-report on their motivation for participation in the DAE in a way that accurately reflects their actual participation. For example, the dividend multiplier may serve as a way to distinguish between participants in the DAE interested in investing in the DAE in order to received significant dividends and participants in the DAE only interested in receiving unemployment payments, for example. Such information about how the participants in the DAE group themselves may allow the DAE and the developers designing or editing the DAE to better understand the motivations and expectations of participants in the DAE in terms of the value the DAE provides to each participant.

In various embodiments, step 332 includes determining the policy holder's stake. Each group has a specific number of policy holders in the group and the policy holders each have a specific stake in that group relative to the other policy holders in the same group. Specifically, the stake of a policy holder is calculated as the total net premiums contributed by the policy holder divided by the total net premiums contributed by all the policy holders in the same group. The total net premiums contributed may be the total of all premiums paid in minus any claims paid out. Further, the stake may be adjusted by multiplying the stake by the dividend multiplier to produce the adjusted stake of each policy holder, relative to the policy holder's specific group.

Once the group, dividend multiplier DM, and stake of each policy holder is determined, step 334 follows step 332 and includes calculating the dividend for each eligible policy holder. In such embodiments, each different group is allocated a portion of the total dividend payouts. In a specific embodiment, the dividend allocated to a specific group is E_grp, the adjusted stake of a policy holder is SA_i, and the dividend award for the policy holder Ediv_i is given by the equation, $$\text{Ediv\_i} = \frac{\text{SA\_i}}{\Sigma_{group} \text{SA}} \cdot \text{E\_grp},$$

where $\Sigma_{group}$ SA is the sum of all the adjusted stakes for all the policy holders in the group. Once step 334 completes, each eligible policy holder has a specific calculated dividend Ediv_i.

Once all the individual dividends of the policy holders have been calculated in step 334, the individual dividends are all summed in step 336. Then, step 338 includes checking if the sum of all the dividends is less than a specific percentage of the policy pool. If the policy pool is not large enough, e.g., does not have enough of the cryptocurrency resource, to pay out the dividends, step 340 completes method of operation 320 with no dividend payout. If the policy pool is large enough to pay out the dividends, step 342 follows step 338 and includes initiating the individual payouts from the fuel module, such as fuel module 150 in FIG. 3. In such embodiments, each policy holder receives his or her individual calculated dividend Ediv_i as a dividend payout from the DAE as a reward for participation in the DAE.

Figure 11:
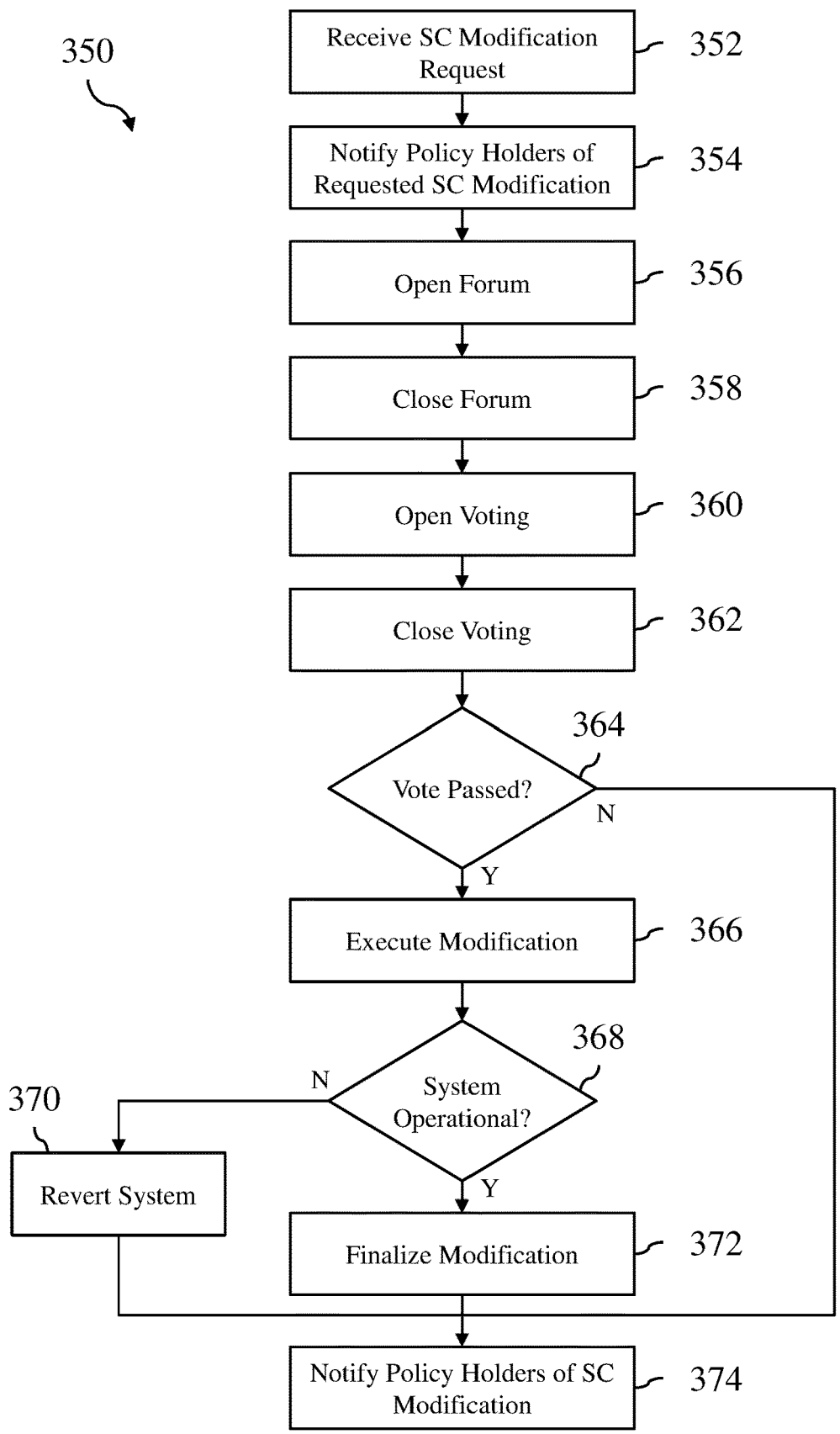
FIG. 11 illustrates a flowchart diagram of an embodiment method of operating a consensus module for an embodiment modular smart contract operating in a DAE.

FIG. 11 illustrates a flowchart diagram of an embodiment method of operation 350 for a consensus module for an embodiment modular smart contract operating in a DAE. According to various embodiments, method of operation 350 includes the operation of a modification module for a DAE, such as consensus module 146 described hereinabove in reference to FIG. 3, which determines how to make changes to the smart contract in the DAE. In specific embodiments where the DAE implements unemployment insurance, method of operation 350 controls and coordinates any changes to the unemployment policy or DAE operation governed by the smart contract. Description of method of operation 350 is directed to tasks related to unemployment insurance; however, similar steps could be executed by a DAE to modify the DAE for other types of systems. Method of operation 350 includes steps 352-374.

In various embodiments, the consensus module receives a smart contract (SC) modification request in step 352. Various participants in the DAE functioning as developers, or developers hired from outside the group of participants in the DAE, may prepare proposed changes to the smart contract operating in the DAE. The proposed changes or modifications are submitted to the consensus module in the DAE. Then, step 354 includes notifying the policy holders, i.e., the DAE participants, of the requested smart contract modifications. The notification may identify lines of code in the smart contract that will be changed and the expected impact of such changes. Each policy holder is able to review the proposed changes. Further, step 354 may include notifying each policy holder of the change process including forum discussions and voting. Notifications for changes to the smart contract, or for any type of communication from the DAE, may be in the form of email, messaging through reputation systems, or through custom web interfaces maintained by the DAE.

Following the notification of the policy holders of the proposed changes, step 356 includes opening a forum for the policy holders to discuss the proposed changes. In such embodiments, the forum may include a forum thread discussing the benefits of the proposed changes, a forum thread discussing the consequences of the proposed changes, and a forum thread discuss other potential impacts that might occur. After a set period of time, step 358 includes closing the forum. For example, the discussion forum may be open for 24 hours.

Following opening and closing the forum, step 360 includes opening the voting period. The DAE may operate and maintain a voting web portal or interface for access and voting by the policy holders. At a specific time, the policy holders are able to submit votes for or against the proposed smart contract modifications. Voting continues until the voting period closes in step 362. Popular comments from the forum discussion may be presented to voters for their consideration during voting.

Step 364 includes checking if the vote passed. In various embodiments, the vote passes if a simple majority votes in favor of the proposed modifications. In other embodiments, the vote may require a larger majority, such as a ⅔ majority. If the vote does not pass, step 374 follows step 364. If the vote does pass, step 366 follows step 364 and includes executing the proposed modifications. Executing the proposed modifications may include opening a smart contract change window. In various embodiments, the smart contract change window is a time period during which rollback of changes is easier than making new changes and the new changes are monitored to determine if there are adverse effects. If the changes to the smart contract affect something that occurs infrequently or where the effects are not seen immediately, the smart contract change window may be a week to several weeks. If the changes to the smart contract affect the functioning of a process that occurs frequently for the smart contract and where change effects are seen immediately, the smart contract change window may be less than one week. In the smart contract change window, the consensus module applies the modifications and loads a new version of the smart contract including the modifications.

Following executing the modifications, step 368 includes checking if the system is operational. For example, the consensus module may perform a diagnostic to determine if the new smart contract including the modifications operates correctly. In such embodiments, this may include a self-diagnostic. If it is determined that the system is not operational in step 368, step 370 follows step 368 and includes reverting the system to the smart contract before the proposed modifications were executed. In some embodiments, reversion of the smart contract to a previous version may be performed during the smart contract change window. If it is determined that the system is operational in step 368, step 372 follows step 368 and includes finalizing the modifications and committing the modifications to a part of the final smart contract.

In various embodiments, step 374 follows step 364, 370, or 372 and includes notifying the policy holders of the smart contract modification that resulted. If the vote did not pass, the policy holders are notified that the vote failed. If the vote passed, but the changes affected the stability of the smart contract in an adverse way, the policy holders are notified that the changes were not stable and that the system reverted. If the vote passed and the changes were successfully executed without destabilizing the system, the policy holders are notified that the vote passed and the smart contract was successfully modified.

FIGS. 12a, 12b, and 12c illustrate a flowchart diagram and grading rubrics for an embodiment human intelligence task (HIT) to evaluate a new application assigned by an embodiment modular smart contract operating in a DAE. In various embodiments, FIGS. 12a, 12b, and 12c describe HITs for evaluating a new application as described hereinabove in reference to step 214 in FIG. 6. FIG. 12a illustrates method of operation 400 for the embodiment HIT including steps 402-420. According to various embodiments, each HIT involves human tasks with interaction from the DAE. The steps are generally provided from the perspective of a human participant in the DAE who, as described hereinabove, may also be referred to as a policy holder.

In various embodiments, step 402 includes receiving a notification of an assigned HIT. When a new HIT is issued by the DAE, such as in step 214 in FIG. 6, the DAE will assign the HIT to a DAE participant, i.e., an evaluator. The DAE participant or evaluator receives notification of the assignment in step 402 via a message service. For example, the evaluator may receive an email, a message through the reputation system, or a message through a dedicated program or application for the DAE. For example, the DAE may operate and communicate through a smart phone app or a web portal.

Step 404 includes receiving the instructions to complete the HIT. The instructions may note the duration, such as 24 hours, the evaluator has to finish the HIT before the HIT will be reassigned. The instructions may outline specific tasks that the evaluator should complete for the DAE as well as best practice instructions for completing the tasks quickly. The instructions may also specify any rules or regulations to consider when evaluating a new application that would cause the application to be considered incomplete or invalid, such as if the applicant provided an invalid reputation system profile.

Step 406 includes completing an honesty pledge. The evaluator may be required to pledge his or her honesty in completing the HIT. This may involve affixing a signature for committing to honestly evaluating the new application.

In various embodiments, step 408 includes accessing the reputation system. The evaluator may access the DAE through a web portal. The web portal may integrate with the reputation system. For example, the DAE may integrate with the reputation system API in order to pull the reputation system profile of the applicant and present it within the web portal for the evaluator to see. As described hereinabove, the reputation system may be LinkedIn or Facebook, for example. Thus, in step 408, the evaluator is able to see the details from the applicant's reputation system profile. Step 408 may also include receiving some of the instructions described hereinabove in reference to step 404 or additional instructions.

Step 410 includes reviewing the application. The evaluator may briefly review the application for completeness and confirm that it matches the reputation system profile provided by the applicant. Following step 410, step 412 includes validating the reputation system profile. In specific embodiments, validating the reputation system profile includes reviewing seven items in order to validate that the reputation system profile is acceptable for creation of an online identity. These items for validating a reputation system profile may be graded according to the embodiment grading rubrics illustrated in FIG. 12b or 12c. The seven items or questions include the following. (1) Is there a picture for the applicant's profile? (2) How many connections are there? (3) Add up the top 10 skills; how many endorsements does the applicant have? (4) How many recommendations has the applicant received? (5) How many recommendations has the applicant given? (6) How many groups does the applicant belong to? (7) How many bullets were written in total for all job descriptions or positions on the applicant's entire reputation system profile? In such embodiments, these seven items may be graded using the grading rubrics described in FIG. 12b or 12c.

Step 414 includes verifying the basic information of the applicant. In specific embodiments, verifying the applicant's basic information includes verifying four items in order to verify the eligibility of the applicant. The four items include the following. (1) Verify the applicant's name. (2) Verify the employment status of the applicant, including that the applicant is employed, is not self-employed, and is not an independent sales agent or distributor for multi-level marketing (MLM) or similar enterprises. (3) Enter or verify the applicant's employers for the past 4 years. (4) Enter or verify the start date and end date for each of the applicant's jobs for the past 4 years. If greater than 50% of the applicant's salary is commission, then a disclaimer may be provided during the evaluation of the application. For example, a first disclaimer may be presented to the applicant that states that, although the applicant is filing for non-self-employed status, application evaluators will carefully evaluate all the evidence to determine if this status is valid. A second disclaimer may be presented to the application evaluators which states that he or she should consider carefully if he or she believes the applicant to be of self-employed status.

Following steps 412 and 414, step 416 includes reviewing the completeness of the applicant's reputation system profile. This may include generally reviewing for missing information or other factors that the evaluator considers to be important. At this step, the evaluator may also note what is specifically missing from the reputation system profile.

In various embodiments, the DAE may generate a score based on the evaluator's submissions from steps 410-416. In other embodiments, the evaluator may generate the score manually. Step 418 includes receiving the generated scores. The scores are generated based on the grading rubrics in FIG. 12b or 12c, for example. The evaluator receives the score corresponding to the validity of the reputation system profile and the score corresponding to the applicant's employment status. In various embodiments, the DAE may also provide recommendations based on the scores.

Based on the scores, step 420 includes the evaluator providing a decision or recommendation. The evaluator is given the recommendations based on the scores in order to choose if the applicant should be granted acceptance to participate in the DAE, e.g., be given a new policy. The evaluator may provide a yes or no decision in some embodiments. In other embodiments, the evaluator may provide an intermediate decision recommending that the applicant reapply after improving his or her reputation system profile. In alternative embodiments, the DAE may make the decision based on the scores generated during the evaluator's review of the application. In such embodiments, steps 418 and 420 may be omitted for the evaluator and the DAE will complete the remaining tasks.

In various embodiments, the DAE may perform a number of steps corresponding to steps 418 and 420. For example, these steps may correspond to step 220 described hereinabove in reference to FIG. 6. In such embodiments, the DAE may process the evaluator's work, which includes the following items, for example. (1) Did the evaluator state that the application meets all the completeness requirements? (2) Did the evaluator complete all 11 verification items corresponding to steps 412 and 414? If not, why not? (3) Grade seven items related to reputation system profile according to grading rubrics in FIG. 12b or 12c. (4) Grade four items related to employment history, help the evaluator determine if the current employment status of the applicant makes the applicant eligible for participation in the DAE, and use the number of jobs and months of unemployment in previous 4 years to calculate a recommendation for eligibility to provide to the evaluator. (5) Present instructions with guidelines or recommendations to the evaluator once the scores are generated. (6) Did the evaluator state that the reputation system profile is complete? (7) Did the evaluator grant or deny the applicant's application for a new policy, i.e., participation in the DAE? Thus, the DAE may participate in the evaluation and generate scores for the evaluator in order to help the evaluator more easily determine whether to recommend accepting or denying the applicant.

Further, as described hereinabove in reference to step 214 in FIG. 6, HITs for evaluating a new application may be assigned in groups, such as groups of five, for example. Thus, the DAE may receive five recommendations from the five evaluators performing the same new application evaluation HIT. In some embodiments, the DAE may require that all the evaluators come to the same conclusion in order to accept or deny an applicant, i.e., the decision is unanimous. In other embodiments, the DAE may only require a majority of the evaluators to provide a same recommendation in order to accept or deny an applicant.

FIG. 12b illustrates one embodiment grading rubric used with method of operation 400 for an embodiment new application evaluation HIT. According to various embodiments, FIG. 12b illustrates a grading rubric for evaluating a new application using LinkedIn as the reputation system. FIG. 12c illustrates another embodiment grading rubric used with method of operation 400 for an embodiment new application evaluation HIT. According to various embodiments, FIG. 12c illustrates a grading rubric for evaluating a new application using Facebook as the reputation system. In further embodiments, additional rubrics may be created for other reputation systems including similar features as disclosed herein. Such additional rubrics are within the scope of this disclosure.

Figure 13:
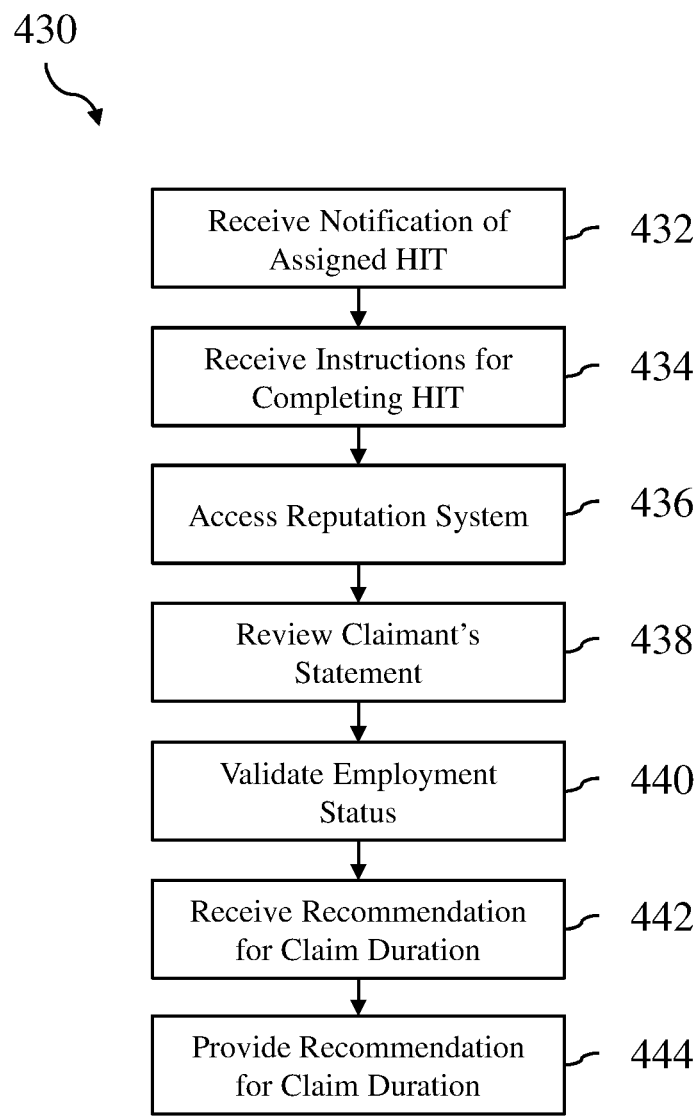
FIG. 13 illustrates a flowchart diagram for an embodiment human intelligence task (HIT) to perform a simple claim process assigned by an embodiment modular smart contract operating in a DAE.

FIG. 13 illustrates a flowchart diagram for an embodiment human intelligence task (HIT) to perform a simple claim process assigned by an embodiment modular smart contract operating in a DAE. In various embodiments, FIG. 13 describes a HIT for evaluating a new claim according to the simple claim process as described hereinabove in reference to step 240 in FIG. 7. FIG. 13 illustrates method of operation 430 for the embodiment HIT including steps 432-444. According to various embodiments, each HIT involves human tasks with interaction from the DAE. The steps are generally provided from the perspective of a human participant in the DAE who, as described hereinabove, may also be referred to as a policy holder.

In various embodiments, step 432 includes receiving a notification of an assigned HIT. When a new HIT is issued by the DAE, such as in step 240 in FIG. 7, the DAE will assign the HIT to a DAE participant, i.e., an evaluator. The DAE participant or evaluator receives notification of the assignment in step 432 via a message service. For example, the evaluator may receive an email, a message through the reputation system, or a message through a dedicated program or application for the DAE. For example, the DAE may operate and communicate through a smart phone app or a web portal.

Step 434 includes receiving the instructions to complete the HIT. The instructions may note the duration, such as 24 hours, the evaluator has to finish the HIT before the HIT will be reassigned. The instructions may outline specific tasks that the evaluator should complete for the DAE as well as best practice instructions for completing the tasks quickly. The instructions may also specify any rules or regulations to consider when evaluating a new claim. The instructions may also inform the evaluator that the process for reviewing a new claim is quicker than awarding a new policy and that, unlike new policy tasks, the reward is only paid to the evaluators if certain conditions are met. The instructions may also include a specific warning for the evaluators that attempts to determine and contact the other evaluators who were given the same HIT in order to communicate about this specific new claim before it is awarded may result in adverse actions taken by the DAE in reference to the evaluators. For example, if evidence is discovered that the evaluators attempted to collude to discuss a claim, all evaluators who colluded will have their privileges to evaluate new claims or new policies revoked for four months and their HITs reassigned, which may result in fines applied to their accounts.

In various embodiments, step 436 includes accessing the reputation system. The evaluator may access the DAE through a web portal. The web portal may integrate with the reputation system. For example, the DAE may integrate with the reputation system API in order to pull the reputation system profile of the applicant and present it within the web portal for evaluator to see. As described hereinabove, the reputation system may be LinkedIn or Facebook, for example. Thus, in step 436, the evaluator is able to see the details from the applicant's reputation system profile. Step 436 may also include receiving some of the instructions described hereinabove in reference to step 434 or additional instructions.

Step 438 includes reviewing the claimant's claim statement. In various embodiments, the claimant is required to submit a short statement describing the reason for unemployment and the expected difficulty of obtaining a new job. The evaluator may briefly review the statement in order to evaluate the authenticity of the request, for example.

In various embodiments, step 440 follows step 438 and includes validating that the claimant's employment status is updated in the claimant's reputation system profile. For example, the evaluator may check if the claimant's LinkedIn profile indicates that the claimant is unemployed. If the employment status is correctly updated, the evaluator can continue the evaluation. If the employment status is not updated, either the evaluator or the DAE may send a message, such as an email, to the claimant with instructions to update his or her reputation system profile status. The evaluator may be asked to check after 24 hours if the employment status has been updated before completing the HIT.

Step 442 includes receiving a recommendation from the DAE for a claim duration. In such embodiments, step 442 may include informing the evaluator as to the health of the premium pool. Step 442 may also include informing the evaluator that eligibility for a claim has been met and a maximum award duration of X days is recommended, where X is determined by the DAE as described hereinabove in reference to FIG. 7. Because the DAE determined that the premium pool is healthy, i.e., the DAE has sufficient resources, the DAE recommends allowing a maximum duration for the claimant.

In step 444, the evaluator provides a recommendation for the claim duration based on the information received from the DAE and reviewed during the HIT. Step 444 includes informing the evaluator that all three, for example, evaluators are rewarded (claim fee÷3) if all three evaluators recommend the same duration. If two evaluators recommend the same duration, then the reward is paid to those two evaluators (claim fee/2). Otherwise, no reward is paid. In such embodiments, the evaluators are encouraged to recommend the maximum duration in order to increase the likelihood of receiving the HIT reward because the duration recommended by the DAE, i.e., the maximum, is the most likely recommendation that the other evaluators will recommend. Thus, this operates as a very simple Schelling point process with an answer provided to the participants in order to bias the outcome towards the maximum duration. However, if the claim appears to be very poor or counterfeit, the evaluator may determine that the most likely recommendation is to recommend a claim duration of zero days, for example. Thus, very poor claims may still be denied in some embodiments.

In various embodiments, the evaluator may submit the recommendation to the DAE through a public blockchain ledger. Thus, the recommendation may be provided using a hashing protocol as similarly described hereinabove in reference to the hashing protocol in FIG. 9. In such embodiments, the evaluator's response is submitted as a hash in order to stop the other evaluators from cheating by looking at what other evaluators have already recommended. Each evaluator submits a hash of his or her recommendation, a time stamp, and a random word to the blockchain. Once the evaluation period is over, the evaluator submits his or her unhashed answer to the DAE. In some embodiments, the evaluator submits the unhashed answer to the DAE through a web portal linked to the backend server. In such embodiments, using a hash commits the evaluator to a specific recommendation at a specific time. Once all of the guesses are collected, the DAE may commit all of the guesses to the blockchain, which can be checked against the hashed choices. This may improve the fairness of the Schelling games.

In various embodiments, based on the recommendations provided, the DAE may determine the claim duration by calculating the median of the three recommendations provided by the three evaluators. Specifically, the DAE may determine the claim duration as described hereinabove in reference to step 252 in FIG. 7.

Figure 14:
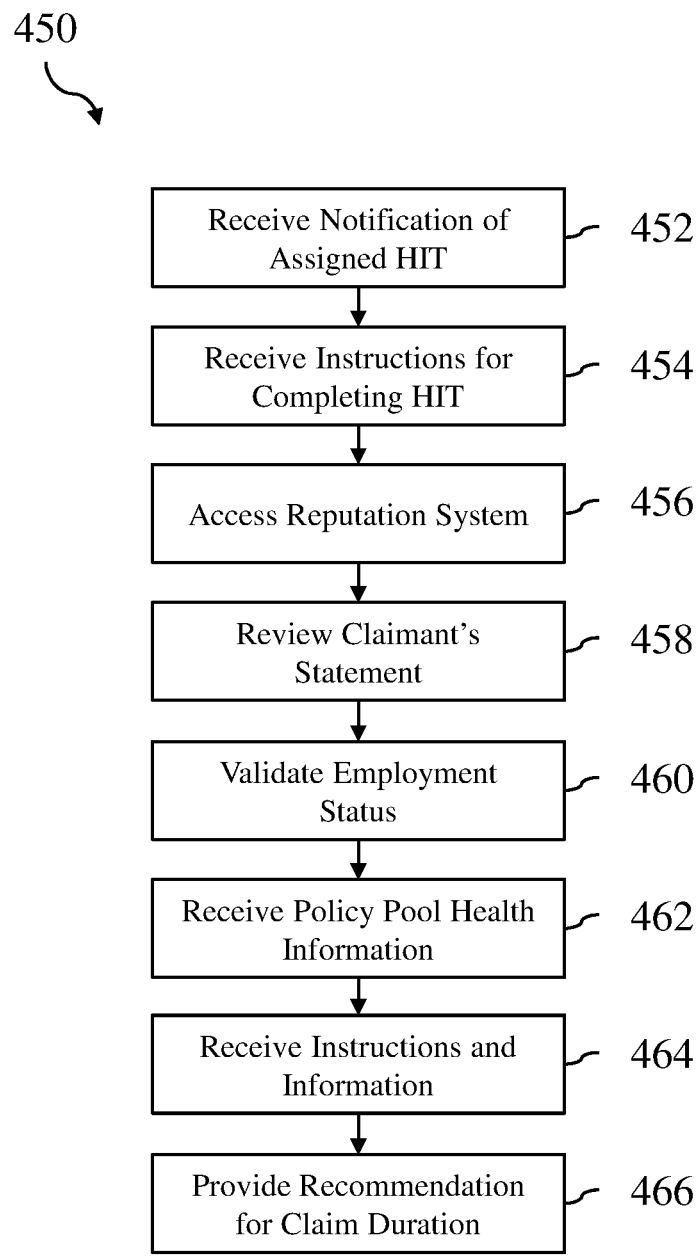
FIG. 14 illustrates a flowchart diagram for an embodiment human intelligence task (HIT) to perform a Schelling claim process assigned by an embodiment modular smart contract operating in a DAE.

FIG. 14 illustrates a flowchart diagram for an embodiment human intelligence task (HIT) to perform a Schelling claim process assigned by an embodiment modular smart contract operating in a DAE. In various embodiments, FIG. 14 describes a HIT for evaluating a new claim according to the Schelling claim process as described hereinabove in reference to step 242 in FIG. 7. FIG. 14 illustrates method of operation 450 for the embodiment HIT including steps 452-466. According to various embodiments, each HIT involves human tasks with interaction from the DAE. The steps are generally provided from the perspective of a human participant in the DAE who, as described hereinabove, may also be referred to as a policy holder.

In various embodiments, step 452 includes receiving a notification of an assigned HIT. When a new HIT is issued by the DAE, such as in step 242 in FIG. 7, the DAE will assign the HIT to a DAE participant, i.e., an evaluator. The DAE participant or evaluator receives notification of the assignment in step 452 via a message service. For example, the evaluator may receive an email, a message through the reputation system, or a message through a dedicated program or application for the DAE. For example, the DAE may operate and communicate through a smart phone app or a web portal.

Step 454 includes receiving the instructions to complete the HIT. The instructions may note the duration, such as 24 hours, the evaluator has to finish the HIT before the HIT will be reassigned. The instructions may outline specific tasks that the evaluator should complete for the DAE as well as best practice instructions for completing the tasks quickly. The instructions may also specify any rules or regulations to consider when evaluating a new claim. The instructions may also inform the evaluator that the process for reviewing a new claim is quicker than awarding a new policy and that, unlike new policy tasks, the reward is paid to the evaluators if certain conditions are met. The instructions may also include a specific warning for the evaluators that attempts to determine and contact the other evaluators who were given the same HIT in order to communicate about this specific new claim before it is awarded may result in adverse actions taken by the DAE in reference to the evaluators. For example, if evidence is discovered that the evaluators attempted to collude to discuss a claim, all evaluators who colluded will have their privilege's to evaluate new claims or new policies revoked for four months and their HITs reassigned, which may result in fines applied to their accounts.

In various embodiments, step 456 includes accessing the reputation system. The evaluator may access the DAE through a web portal. The web portal may integrate with the reputation system. For example, the DAE may integrate with the reputation system API in order to pull the reputation system profile of the applicant and present it within the web portal for evaluator to see. As described hereinabove, the reputation system may be LinkedIn or Facebook, for example. Thus, in step 456, the evaluator is able to see the details from the applicant's reputation system profile. Step 456 may also include receiving some of the instructions described hereinabove in reference to step 434 or additional instructions.

Step 458 includes reviewing the claimant's claim statement. In various embodiments, the claimant is required to submit a short statement describing the reason for unemployment and the expected difficulty of obtaining a new job. The evaluator may briefly review the statement in order to evaluate the authenticity of the request, for example.

In various embodiments, step 460 follows step 458 and includes validating that the claimant's employment status is updated in the claimant's reputation system profile. For example, the evaluator may check if the claimant's LinkedIn profile indicates that the claimant is unemployed. If the employment status is correctly updated, the evaluator can continue the evaluation. If the employment status is not updated, either the evaluator or the DAE may send a message, such as an email, to the claimant with instructions to update his or her reputation system profile status. The evaluator may be asked to check after 24 hours if the employment status has been updated before completing the HIT.

Step 462 includes a process where claim evaluators receive policy pool health information to make educated decisions about the award length of a claim. The health of the policy poll is calculated as described hereinabove in reference to step 236 in FIG. 7. Claim evaluators are able to simulate predictions, based on the calculations described in reference to step 236, of how long the policy pool will continue to be able to pay out claims based upon five key factors, three of which are fixed and two of which can be adjusted to change the outcomes of predictions. These key factors allow for claim evaluators to extrapolate the consequences of any singular claim by simulating the repercussions if all future claims were paid similarly. The simulation is a way to evaluate what would happen if the existing claim became the status quo and how long the policy pool would continue to pay out claims. The three fixed factors, as described in reference to step 236 in FIG. 7, which remain constant for determining policy pool health P_health are: (1) Number of policy holders participating, (2) Total value of premiums paid for the previous month EP_month, and (3) Projected overhead E_yr associated with network fees and shareholder dividends. These factors are based on the most current data gathered from last month's policy holders, premiums paid, and overhead costs. The two factors which can be manipulated to determine policy pool health are: (1) Number of days awarded for the length of all future claims and (2) Constant average future unemployment rate among policy holders participating in the DAE. Based on these inputs the simulation calculates the number of months until the policy pool is exhausted TP_exhaust, as described hereinabove in reference to step 236 in FIG. 7, given that the above factors become the status quo for the policy. The DAE provides the calculated information regarding how long until the policy pool is exhausted to the evaluator.

Step 464 includes the specific information and instructions provided to claim evaluators for them to fairly award the length of a claim. In addition to being provided with the number of months till the premium pool is exhausted TP_exhaust in the simulation as outlined in step 462, evaluators are also informed of three additional pieces of information. The three pieces of information include the following. (1) The current unemployment rate among policy holders in the policy pool. (2) The average length of a claim that was awarded for new claims last month for claims in the same category given the following three categories: (A) months of premiums paid >6 months, (B) months of premiums paid >9 months, and (C) months of premiums paid >12 months. (3) The number of weeks (presented as months) the claimant estimated it would take for him or her to find his or her next job. The evaluators are informed they are never required to give an award greater than the time a claimant estimates it will take him or her to find his or her next job, but, in order to limit the number of claim extensions, they are encouraged to award the maximum claim length for which the claimant is eligible. The evaluators are instructed to give the highest possible award the system can pay out within the following two constraints: (1) At existing unemployment levels a claim award should not exhaust the policy pool in the simulation in less than 18 months and (2) At unemployment levels which are 1%-2% higher than existing levels a claim award should not exhaust the policy pool in the simulation in less than 12 months. If the highest possible award given these constraints is less than the time the claimant estimates it will take for him or her to find his or her next job evaluators are informed that claimants always have the ability to file for an extension if they need it. Evaluators are presented with a short 1 minute video of the claim evaluation process to assist them to understand how fair awards are determined according to a Schelling mechanism.

Step 466 includes the process by which evaluators provide their recommendation for the duration of a claim. According to various embodiments, evaluators are informed that a total of 12 others also must decide what they believe to be a fair claim length. To incentivize a consensus without the evaluators being able to communicate directly, a Schelling game is initiated where awards are given in the following circumstances. (1) 6 or more evaluators choose the same claim award length. In such embodiments, random selection determines that an award of (claim fee÷3) be given to 3 of X participants with the same answer. (2) Less than 6 evaluators choose the same award. In which case the 3 answers closest to the median are awarded a value of (claim fee÷3). In such embodiments, random selection is used to settle any ties. Evaluators are then asked to guess a claim length measured in days that they believe is what most policy holders would consider to be fair. As described previously hereinabove, a process of hashing each guess and submitting the hash in an initial round before revealing the actual guess is used to prevent any evaluator from gaining an unfair advantage provided by the knowledge of others guesses by looking at the blockchain. Once all guesses are submitted the Schelling game provides a consensus opinion as to what most of the twelve evaluators believe is a fair claim award. In various embodiments, this award, rounded up to the nearest full week, is granted to the claimant. Finally, the DAE determines the awards for the participants based on the above two circumstances and pays out the determined awards.

In various embodiments, based on the recommendations provided, the DAE may determine the claim duration by calculating the median of the twelve recommendations provided by the twelve evaluators. Specifically, the DAE may determine the claim duration as described hereinabove in reference to step 254 in FIG. 7.

In further embodiments, the DAE may also include additional HITs that are not specifically described herein. For example, in embodiments involving unemployment insurance, the DAE may be capable of extending an unemployment claim. Such extensions may involve a HIT similar to the initial claim evaluation, such as a simplified version. Other HITs may also be included in various embodiment DAEs in order to add additional functionality as appropriate for the specific application of the DAE. Further, the DAE may allow additional modification to, for example, the underlying smart contract in order to add mechanisms for additional HITs if further functionality is useful. Thus, embodiment DAEs may include the ability to modify and expand overtime to perform additional tasks and add additional features. Such modification may be accomplished through the use of consensus module 146 as described hereinabove in reference to FIGS. 3 and 11, for example.

Figure 15:
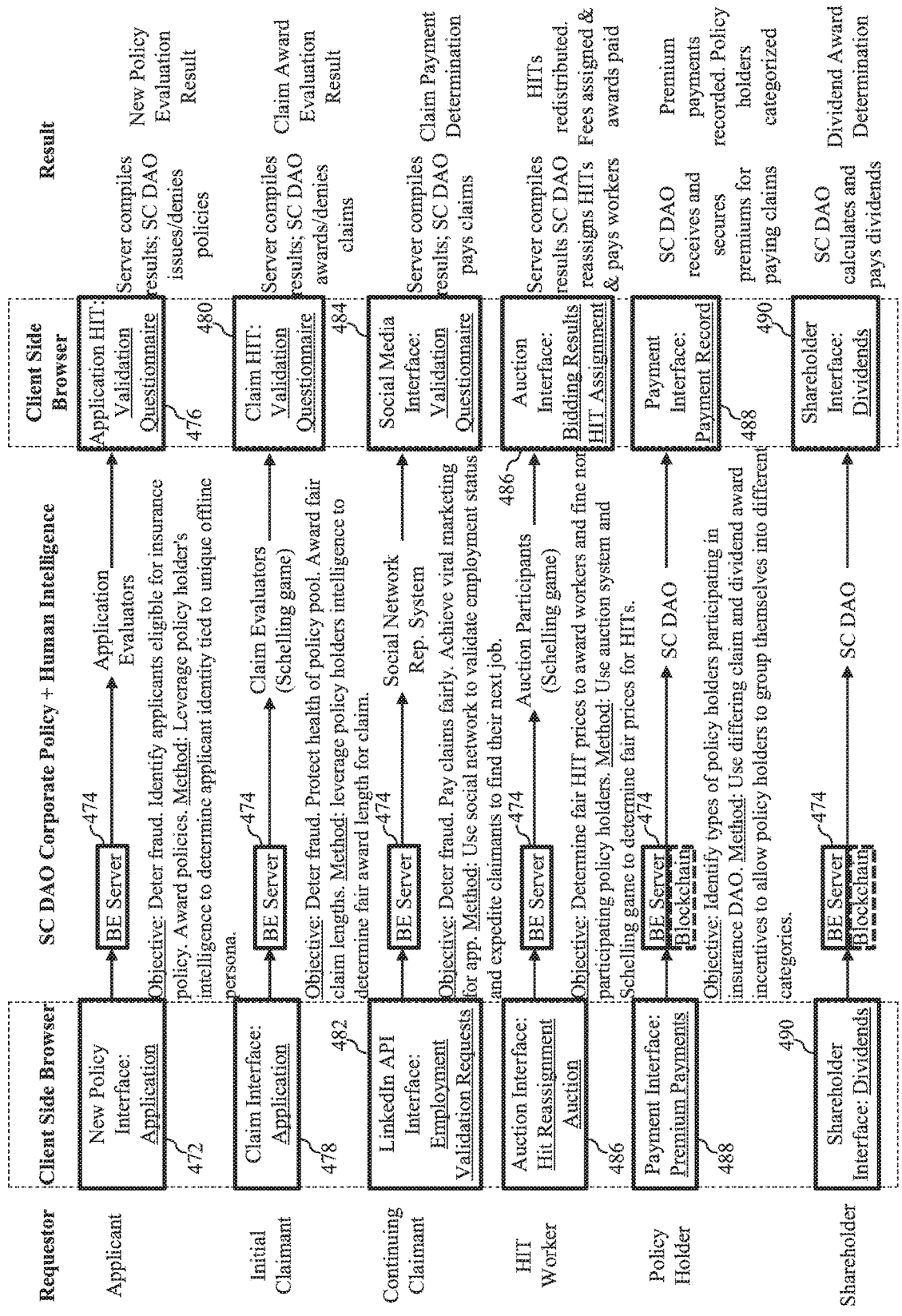
FIG. 15 illustrates a block diagram of a further embodiment web interface.

FIG. 15 illustrates a block diagram of a further embodiment web interface 470, which may be one implementation of web interface 104 described hereinabove in reference to web interface 104 in FIGS. 1 and 4. According to various embodiments, web interface 470 includes the various interfaces used by the DAE and the various parties interacting with the DAE. Web interface 470 includes a way to process new policy applications. The applicant uses the New Policy Interface 472 to fill out an application in the browser interface. The module for this application is stored on backend server 474 and sent to backend server 474 for processing. Backend server 474 then distributes a validation questionnaire to HIT evaluators, through application HIT interface 476, who then decide based upon the grade they give an applicant's social media profile whether or not to issue a new policy to the applicant.

Web interface 470 also includes a way to process initial claims. The claimant uses the claim interface 478 to submit an application in the browser interface. The module for this application is stored on backend server 474 and sent to the backend server for processing. The backend server then distributes a validation questionnaire to HIT evaluators, through claim HIT interface 480, who then decide based upon various criteria, such as the application submitted by the claimant, the claimant's updated social media profile to show his or her current employment status as unemployed, and the health of the policy pool, what is a fair length that should be awarded for a claim.

Web interface 470 also includes a way to process continuing claims by using employment validation requests from within the clients browser interface through API interface 482. This module is stored on backend server 474 and is sent to backend server 474 for processing. Integration with social media through social media interface 484 allows for the claimant's social network to serve as validators for the claimants current employment status. The claimant's social network receives an email requesting the members of the claimant's social network login using their social media profiles in order to answer a questionnaire that gathers responses to process claim payments. Claims are paid based on responses made by the claimant's social network submitted to backend server 474 via the client's web browser. Backend server 474, once it receives responses from the claimants social network that are deemed valid, instructs the blockchain smart contract to distribute funds to the claimant.

Web interface 470 also includes a way to determine the fair price of a reassigned HIT as well as a process for HIT redistribution. Auction participants, as clients, download a module from backend server 474 as auction interface 486, which the participants run in their client's browser that allows them to bid on HITs and receive the right to complete HITs for an award determined by the auction mechanism. Results are submitted to backend server 474 which then coordinates the HIT workers to complete reassigned HITs. Once HITs are reassigned and verified as complete, the backend server directs the blockchain smart contract to pay awards to HIT workers and to impose fees to non-participating policy holders.

Web interface 470 also includes a way that policy holders can pay insurance premium payments through payment interface 488. A module is downloaded from the blockchain smart contract and from backend server 474 that allows the policy holder to pay premiums from within his or her client browser window from a cryptocurrency address containing funds whose private keys are managed by the client's browser. These payments are then processed by the blockchain smart contract and a database is updated on backend server 474 to record these payments.

Web interface 470 also includes a shareholder module which allows for shareholders (policy holders who qualify for dividends) to download a module as shareholder interface 490 from both the blockchain smart contract and also from backend server 474 which allows the shareholder to receive dividends from within his or her client browser window to a cryptocurrency address containing funds whose private keys are managed by the client's browser. These payments are processed by the blockchain smart contract and a database is updated on backend server 474 to record these payments.

Although described herein primarily in reference to unemployment insurance, or, through equivalent applications, to severance package management or rotating savings credit associations, various embodiment DAEs may operate in numerous contexts with numerous applications. The various embodiments described herein may be extended to a DAE capable of accumulating resources, managing human access to and participation in the DAE using identity validation techniques, allocating resources in a fair and accurate manner, leveraging human intelligence for computationally complex tasks related to determining participation and allocating resources, maintaining transparency through publicly auditable operation, encouraging further participation through self-marketing techniques, and establishing trust through reliable and transparent operation with identified participants. In such embodiments, using a primary resource that provides access to both additional computational operations and minimally regulated, decentralized monetary resources may help to enable the autonomy and continued operation of the DAE. For example, Ethereum is a cryptocurrency platform that requires the ether cryptocurrency in order to perform computations on the decentralized blockchain and also provides a cryptocurrency for use as a monetary incentive. Various embodiment DAEs may operate in full or in part through the Ethereum platform or an equivalent decentralized platform.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A processing network configured to:
   access a reputation system;
   provide a first user interface, wherein the first user interface includes information from the reputation system;
   provide a second user interface;
   receive a request from a user through the second user interface;
   retrieve user information from the reputation system;
   evaluate an amount of a primary resource controlled by the processing network;
   select between a first process and a second process based on evaluating the amount of the primary resource controlled by the processing network;
   assign a plurality of human intelligence tasks based on the request, wherein
      the plurality of human intelligence tasks are assigned to a plurality of participants through the first user interface, and
      the plurality of human intelligence tasks comprises a first set of tasks if the first process is selected and a second set of tasks if the second process is selected;
   receive a plurality of results from the plurality of human intelligence tasks;
   confirm an identity and a status of the user based on the user information and the plurality of results;
   execute the request based on confirming the identity and the status of the user; and
   store evidence of execution of the request as an immutable data entry in a permanent database, wherein the processing network comprises a plurality of decentralized computing nodes in a blockchain consensus system, the plurality of decentralized computing nodes operating a virtual machine as a decentralized autonomous entity using the blockchain consensus system, wherein receiving the request, assigning the plurality of human intelligence tasks, confirming the identity and the status of the user, executing the request, and storing evidence of execution of the request as an immutable data entry in a permanent database are performed by the virtual machine, and wherein the blockchain consensus system comprises a blockchain comprising the permanent database.

2. The processing network of claim 1, comprising a server, wherein accessing the reputation system, providing the first user interface, and providing the second user interface are performed by the server.

3. The processing network of claim 2, wherein retrieving user information from the reputation system is performed by the server.

4. The processing network of claim 1, wherein the plurality of decentralized computing nodes are connected through a private network.

5. The processing network of claim 1, wherein the plurality of decentralized computing nodes are connected through internet connections.

6. The processing network of claim 1, wherein the virtual machine comprises:
  a database module configured to maintain a listing of each user associated with the decentralized autonomous entity;
  a new user module configured to receive an application for participation in the decentralized autonomous entity, process the application, assign human intelligence tasks for the application, and add a new user to the database module based on processing the application and results of the human intelligence tasks;
  a resource authorization module configured to receive a request for resources, process the request, assign human intelligence tasks for the request, and authorize resource allocation based on processing the request and results of the human intelligence tasks;
  an auction module configured to receive bids for uncompleted human intelligence tasks and reassign uncompleted human intelligence tasks based on the bids; and
  a resource bank configured to allocate resources comprising the primary resource to the database module, the new user module, the resource authorization module, the auction module, and a user associated with the decentralized autonomous entity based on resource allocation authorizations received from the resource authorization module or the auction module.

7. The processing network of claim 6, wherein the primary resource is operable to obtain compute cycles from the plurality of decentralized computing nodes in the blockchain consensus system.

8. The processing network of claim 7, wherein the blockchain consensus system is Ethereum and the primary resource is ether.

9. The processing network of claim 6, wherein the resource authorization module is further configured to authorize resource allocations to the plurality of participants for the plurality of human intelligence tasks.

10. The processing network of claim 1, wherein the reputation system comprises a social media networking system.

11. The processing network of claim 10, wherein the social media networking system is provided by Facebook or LinkedIn.

12. A method of operating a decentralized autonomous entity, the method comprising:
  receiving a resource request through a first user interface from a user associated with the decentralized autonomous entity, the resource request being for an allocation of a primary resource of the decentralized autonomous entity;
  confirming a status of the user, wherein confirming the status comprises:
    obtaining information about the user from a reputation system,
    requesting confirmation from contacts in a network of the user from the reputation system, and
    determining the status of the user based on the information about the user from the reputation system and confirmation from contacts in the network of the user;
  assigning human intelligence tasks through a second user interface based on the status of the user;
  receiving results of the human intelligence tasks through the second user interface;
  determining an extent of resource allocation based on receiving the results of the human intelligence tasks;
  initiating a resource allocation based on the extent of resource allocation determined; and
  storing evidence of the resource allocation as an immutable data entry in a permanent database.

13. The method of claim 12, wherein
  the decentralized autonomous entity is operated on a blockchain consensus system; and
  the blockchain consensus system comprises a blockchain comprising the permanent database.

14. The method of claim 13, wherein the blockchain consensus system comprises Ethereum.

15. The method of claim 12, wherein the reputation system comprises a social media networking system.

16. The method of claim 12, further comprising allocating an amount of the primary resource for each of the human intelligence tasks that is completed.

17. The method of claim 12, wherein the primary resource is operable to obtain compute cycles for the decentralized autonomous entity.

18. The method of claim 12, further comprising:
  evaluating an amount of the primary resource controlled by the decentralized autonomous entity; and
  generating a resource allocation recommendation based on evaluating the amount of the primary resource controlled by the decentralized autonomous entity,
  wherein assigning human intelligence tasks through the second user interface comprises providing the resource allocation recommendation through the second user interface.

19. A computer network comprising:
  a plurality of computing nodes, each computing node of the plurality of computing nodes comprising a memory and a processor configured to execute instructions stored on the processor, wherein the computer network comprises a smart contract stored on the memory of each computing node of the plurality of computing nodes, and wherein the smart contract is configured to operate a decentralized autonomous entity (DAE) on a blockchain publishing platform, the DAE configured to:
    allocate resources between a plurality of sub-modules of the DAE, human participants in the DAE performing tasks in exchange for resources, and human participants in the DAE requesting allocation of resources;

determine resource allocations for resource allocation requests and for tasks performed for the DAE by participants in the DAE, wherein determining resource allocations comprises employing a Schelling mechanism;

notarize results of data received from the participants in the DAE, wherein notarizing results comprises submitting results of data received to the blockchain publishing platform;

receive a participation request to participate in the DAE from a first requester, wherein the participation request includes information from a reputation system and a plurality of human contacts provided by the first requester through the reputation system;

evaluate an identity and honesty of the first requester, wherein evaluating the identity and honesty comprises:
- preparing an evaluation opinion based on the information from the reputation system and additional information received from the plurality of human contacts,
- submitting a first task to a first plurality of human agents along with the evaluation opinion,
- allocating a first amount of a primary resource to the first plurality of human agents upon completion of the first task, and
- aggregating responses received from the first plurality of human agents during the completion of the first task by each human agent of the first plurality of human agents;

alter the DAE to include the first requester as a participant in the DAE based on evaluating the identity and honesty of the first requester;

receive an allocation request to allocate a second amount of the primary resource from a second requester, wherein the second requester is a participant in the DAE and the allocation request includes information from a reputation system;

evaluate the allocation request, wherein evaluating the allocation request comprises:
- determining an amount of the primary resource available to the DAE,
- preparing an allocation opinion based on the amount of the primary resource available,
- submitting a second task to a second plurality of human agents along with the allocation opinion, and
- aggregating responses received from the second plurality of human agents during the completion of the second task by each of the second plurality of human agents; and authorize the allocation request based on evaluating the allocation request.

20. The computer network of claim 19 wherein the reputation system comprises a social media networking system.

21. The computer network of claim 19, wherein the blockchain publishing platform comprises Ethereum.

* * * * *